United States Patent
Kawabe et al.

(10) Patent No.: US 7,496,212 B2
(45) Date of Patent: Feb. 24, 2009

(54) CHANGE DETECTING METHOD AND APPARATUS

(75) Inventors: Tsuyoshi Kawabe, Tokyo (JP); Hirotada Ueda, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1085 days.

(21) Appl. No.: 10/840,366

(22) Filed: May 7, 2004

(65) Prior Publication Data
US 2004/0233286 A1 Nov. 25, 2004

(30) Foreign Application Priority Data
May 16, 2003 (JP) .............................. 2003-139179
Sep. 29, 2003 (JP) .............................. 2003-338677

(51) Int. Cl.
*G06K 9/00* (2006.01)
(52) U.S. Cl. ..................................................... 382/103
(58) Field of Classification Search ................. 382/103, 382/107; 348/159
See application file for complete search history.

(56) References Cited

U.S. PATENT DOCUMENTS 6,476,858 B1 * 11/2002 Ramirez Diaz et al. ..... 348/159

FOREIGN PATENT DOCUMENTS

| JP | 08123946 | 5/1996 |
|----|----------|--------|
| JP | 08334476 | 12/1996 |
| JP | 09330415 | 12/1997 |
| JP | 10150656 | 6/1998 |
| JP | 1118001 | 1/1999 |
| JP | 200059762 | 2/2000 |
| JP | 200186456 | 3/2001 |

OTHER PUBLICATIONS

U.S. Appl. No. 10/820,031, filed Apr. 8, 2004.

* cited by examiner

*Primary Examiner*—Tom Y Lu
(74) *Attorney, Agent, or Firm*—Mattingly, Stanger, Malur & Brundidge, P.C.

(57) ABSTRACT

A change detecting method and apparatus constituted by an input portion for inputting image data obtained by imaging apparatus, a processing unit for processing the image data inputted from the input portion, and a storage for storing the image data. The processing unit has an image data change detecting portion, a monitoring information generating/transmitting portion. The storage has a monitoring schedule table. The image data change detecting portion reads the image data from the storage based on the monitoring schedule table, and detects a change in image data from the image data. The monitoring information generating/transmitting portion generates monitoring information based on a result of the detected change and outputs the monitoring information.

16 Claims, 22 Drawing Sheets

FIG. 6

|   | 1 | 2 | 3 | 4 | 5 | 6 | 7 | 8 | 9 |
|---|---|---|---|---|---|---|---|---|---|
| 1 | OFF | OFF | OFF | OFF | OFF | OFF | OFF | OFF | OFF |
| 2 | OFF | OFF | OFF | OFF | ON | OFF | OFF | OFF | OFF |
| 3 | OFF | OFF | OFF | ON | ON | ON | OFF | OFF | OFF |
| 4 | OFF | OFF | OFF | ON | ON | ON | OFF | OFF | OFF |
| 5 | OFF | OFF | ON | ON | ON | ON | ON | OFF | OFF |
| 6 | OFF | OFF | ON | ON | ON | ON | ON | OFF | OFF |
| 7 | OFF | ON | ON | ON | ON | ON | ON | ON | OFF |
| 8 | OFF | ON | ON | ON | ON | ON | ON | ON | OFF |
| 9 | ON | ON | ON | ON | ON | ON | ON | ON | ON |

FIG. 15

| | 1 | 2 | 3 | 4 | 5 | 6 | 7 | 8 | 9 |
|---|---|---|---|---|---|---|---|---|---|
| 1 | OFF | OFF | OFF | OFF | OFF | OFF | OFF | OFF | OFF |
| 2 | OFF | OFF | OFF | OFF | OFF | OFF | OFF | OFF | OFF |
| 3 | OFF | OFF | OFF | OFF | OFF | OFF | OFF | OFF | OFF |
| 4 | OFF | OFF | OFF | OFF | OFF | OFF | ON | ON | ON |
| 5 | OFF | OFF | OFF | OFF | OFF | OFF | ON | ON | ON |
| 6 | ON | ON | ON | ON | OFF | OFF | ON | ON | ON |
| 7 | ON | ON | ON | ON | OFF | OFF | OFF | OFF | OFF |
| 8 | ON | ON | ON | ON | OFF | OFF | OFF | OFF | OFF |
| 9 | ON | ON | ON | ON | OFF | OFF | OFF | OFF | OFF |

| | 1 | 2 | 3 | 4 | 5 | 6 | 7 | 8 | 9 |
|---|---|---|---|---|---|---|---|---|---|
| 1 | ON | ON | ON | OFF | OFF | OFF | OFF | OFF | OFF |
| 2 | ON | ON | ON | OFF | ON | OFF | OFF | OFF | OFF |
| 3 | ON | ON | ON | OFF | OFF | OFF | OFF | OFF | OFF |
| 4 | ON | ON | ON | OFF | OFF | OFF | OFF | OFF | OFF |
| 5 | ON | ON | ON | OFF | OFF | OFF | OFF | OFF | OFF |
| 6 | OFF | OFF | OFF | OFF | OFF | OFF | OFF | OFF | OFF |
| 7 | OFF | OFF | OFF | OFF | OFF | OFF | OFF | OFF | OFF |
| 8 | OFF | OFF | OFF | OFF | OFF | OFF | OFF | OFF | OFF |
| 9 | OFF | OFF | OFF | ON | ON | OFF | OFF | OFF | OFF |

CHANGE DETECTING METHOD AND APPARATUS

INCORPORATION BY REFERENCE

The present application claims priorities from Japanese applications JP 2003-139179 filed on May 16, 2003 and JP 2003-338677 filed on Sep. 29, 2003, the contents of which are hereby incorporated by reference into this application.

CROSS-REFERENCE TO RELATED APPLICATION

This application relates to the subject matter of U.S. patent application Ser. No. 10/820,031 assigned to the same assignee of the present invention and filed on Apr. 8, 2004 in the names of Tsuyoshi Kawabe, Hirotada Ueda and Kazuhito Yaegashi and entitled "Video Distribution Method and Video Distribution System", the disclosure of which is hereby incorporated by reference.

BACKGROUND OF THE INVENTION

The present invention relates to a technique for detecting a change in a region to be monitored, and particularly relates to a method and an apparatus for detecting a change in an image obtained by imaging apparatus.

In recent years, for monitoring invading objects by means of imaging apparatus such as a monitoring camera, an image storing and image distributing technique using a network technique such as the Internet or a LAN has been being developed. Further, a technique for storing images as digital data in a storage such as a hard disk or a DVD has been developed.

Further, techniques for detecting a change in an image from an imaging apparatus by use of image recognition technology, and notifying the detection of the change by displaying a message to that effect on a monitor, turning an alarm lamp on or the like are being developed. Further, techniques for transmitting or notifying monitoring information to network-connected PC or a portable terminal when a change in images from an imaging apparatus is detected by using image recognition techniques, are being developed.

SUMMARY OF THE INVENTION

Since a conventional reporting apparatus (sometimes referred to as notification apparatus) with a change detection function has no means for changing its operating status, it is necessary to change the operating status manually. That is, when there is no necessity of monitoring, it is necessary to do an act such as turning off the power of the reporting apparatus manually. Similarly, it is necessary to turn on the power of the reporting apparatus manually when monitoring is resumed. In an actual operation, it is expected that there may be a scene where the reporting apparatus does not have to be operated, for example, in a period of time when a guard is ready. It is therefore desired that a timer can be set to switch monitoring on and off automatically in accordance with time.

In addition, as for a region to be image-recognized in the reporting apparatus in the background art, image recognition is performed on the whole image of the monitoring camera. However, in an actual operation, when image recognition is performed, there may occur a situation where monitoring is performed on only a necessary region of the image while any moving object in the other region is not treated as the target of the monitoring. Further, when image recognition is performed, there may occur necessity to change the region to be monitored in accordance with each period of time. In such a case, the region to be monitored has to be changed manually on time. In such a manner, in the operation of the reporting apparatus in the background art, various changes are required, so that not only is there a problem that manual operation is troublesome, but there is also a problem that some changes may be made erroneously.

It is an object of the present invention to provide a change detecting method and apparatus in which monitoring processing can be controlled easily in accordance with a period of time or an image recognition region.

It is another object of the present invention to provide a change detecting method and apparatus in which a monitoring schedule or an image recognition region can be established desirably and in advance.

A change detecting apparatus according to an aspect of the present invention includes an input portion for inputting image data obtained by an imaging apparatus, a processing unit for processing the image data inputted from the input portion, and a storage for storing the image data, wherein the processing unit has an image data change detecting portion and a monitoring information generating/transmitting portion, wherein the storage has a monitoring schedule table, wherein the image data change detecting portion reads the image data from the storage in accordance with the monitoring schedule table and detects a change in image data from the image data, and wherein the monitoring information generating/transmitting portion generates a signal representing the change in image data and outputs the signal to a detection result receiving unit which is connected to the change detecting apparatus.

Incidentally, description will be made using the term "monitoring information" herein. For example, "warning information" and "detection information" are similar terms, which are included in the present invention. In addition, "monitoring information" is a general term of information to be transmitted from a reporting apparatus to others, but it is not limited to the original meaning of the word "monitoring". In addition, an example of the reporting apparatus herein is an apparatus having a function of transmitting the monitoring information.

In addition, description will be made using the term "monitoring system" herein. For example, "notifying system" and "object detecting system" are similar terms, which are included in the present invention.

Other objects, features and advantages of the present invention will be made clear in the following description of embodiments of the present invention with reference to the accompanying drawings.

BRIEF DESCRIPTION OF THE DRAWINGS

FIG. 6 is a diagram showing an example of a table for setting image recognition regions according to the present invention;

FIG. 15 is a diagram showing an example of a table for setting image recognition regions according to the present invention;

FIG. 17 is a diagram showing an example of a table for setting image recognition regions according to the present invention;

DESCRIPTION OF THE EMBODIMENTS

Figure 18:
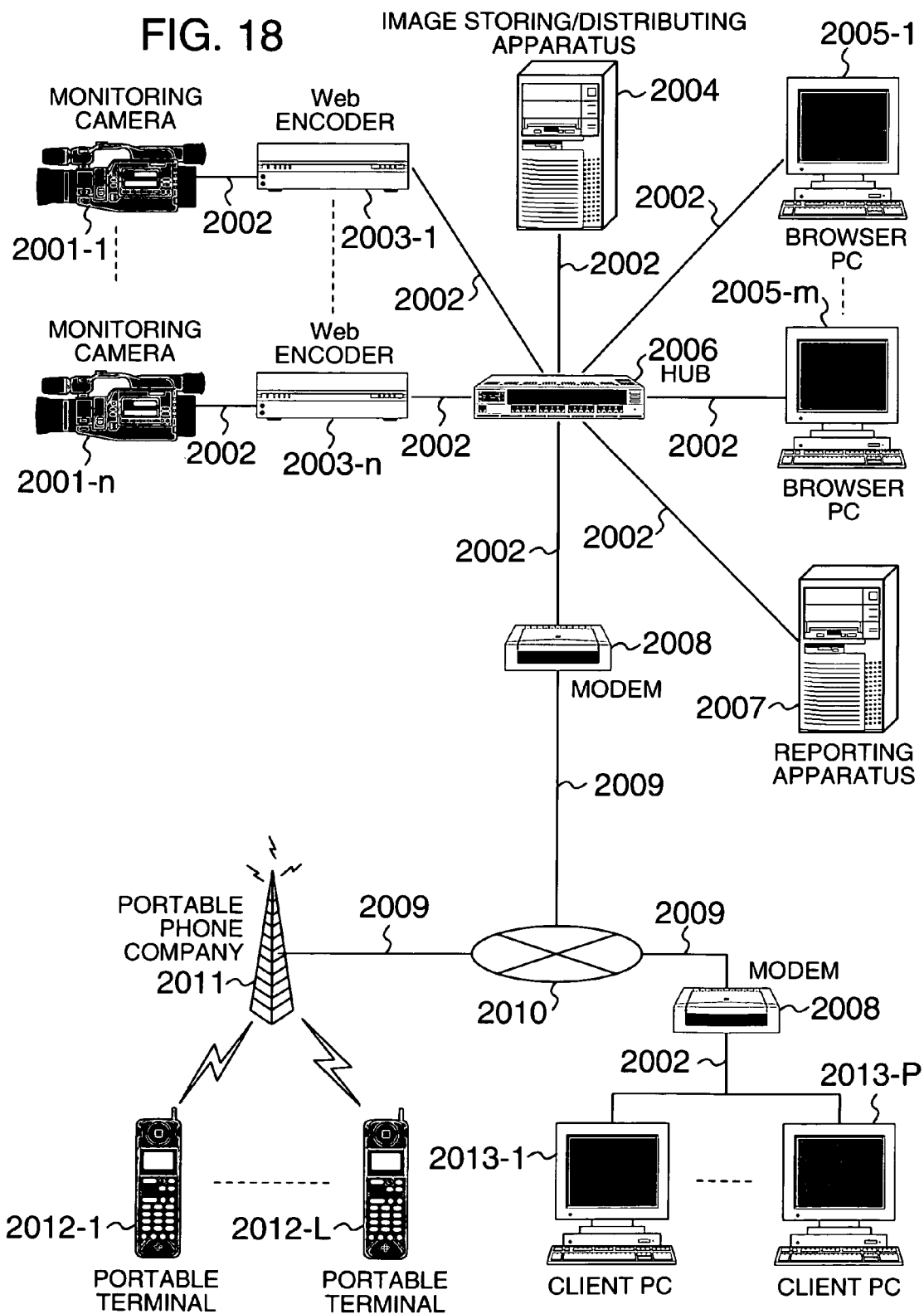
FIG. 18 is a diagram showing an example of the configuration of a network monitoring system according to an embodiment of the present invention.

FIG. 18 is a diagram showing the configuration of a monitoring system according to an embodiment of the present invention.

The system configuration of a monitoring system using an image storing/distributing apparatus (sometimes referred to as image accumulation and distribution apparatus) and a reporting apparatus will be described with reference to FIG. 18.

In FIG. 18, reference numerals 2001-1, 2001-2, ..., 2001-n (n=1, 2, ...) designate a plurality of monitoring cameras. Incidentally, reference numeral 2001 will be used to collectively refer to the monitoring cameras. The same holds true other devices. The reference numeral 2002 represents a transmission line of video signals and the like, such as a LAN (Local Area Network). The reference numerals 2003-1, 2003-2, ..., 2003-n (n=1, 2, ...) designate Web encoders. The reference numeral 2004 represents an image storing/distributing apparatus having a function of storing images from the monitoring cameras and distributing the images to users demanding them.

The reference numerals 2005-1, 2005-2, ..., 2005-m (m=1, 2, ...) designate browser PCs having a function of managing the monitoring system as a whole. The reference numeral 2006 represents a hub; 2007, a reporting apparatus; 2008, a modem; 2009, a transmission line using a public circuit; 2010, a WAN (Wide Area Network) such as the Internet; 2011, a portable phone company; 2012-1, 2012-2, ..., 2012-l (l=1, 2, ...), portable or mobile terminals; and 2013-1, 2013-2, ..., 2013-p (p=1, 2, ...), client PCs. Incidentally, the number of monitoring cameras or the like may be one.

The imaging apparatus 2001, the Web encoder 2003, the image storing/distributing apparatus 2004, the hub 2006, the reporting apparatus 2007, the modem 2008 and the client PC 2013 are connected with one another through the transmission line 2002 such as LAN. The portable phone company 2011 is connected to the modem 2008 through the transmission line 2009 and the network 2010. In addition, the portable phone company 2011 is connected to the portable terminal 2012 by wireless or the like.

An image picked up or taken by the monitoring camera 2001 is converted into a digital compressed image by the Web encoder, and the converted data is always stored in the image storing/distributing apparatus 2004. When the browser PC 2005 or the reporting apparatus 2007 makes a request for an image to the image storing/distributing apparatus 2004, the image is transmitted to browser PC 2005 or the reporting apparatus 2007.

Figure 19:
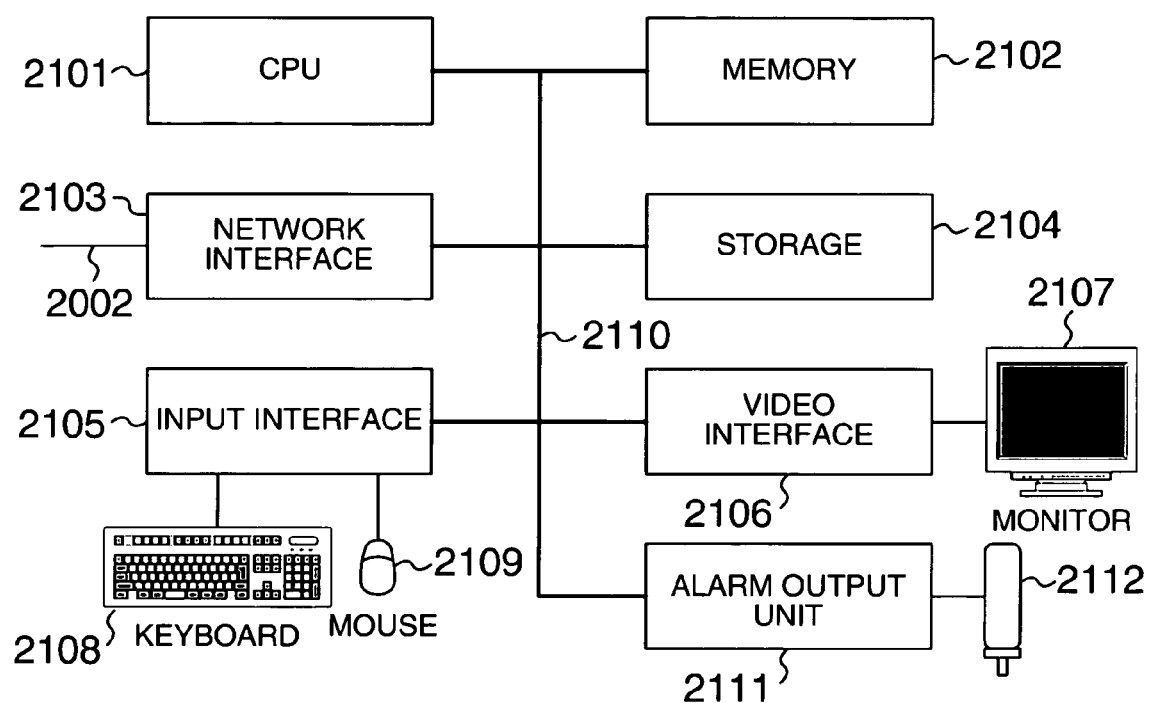
FIG. 19 is a block diagram showing the schematic configuration of a reporting apparatus in the network monitoring system in FIG. 18.

FIG. 19 is a block diagram showing the schematic configuration of the reporting apparatus 2007. The reference numeral 2101 represents a CPU; 2102, a memory; 2103, a network interface; 2104, a storage; 2105, an input interface; 2106, a video interface; 2107, a monitor; 2108, an input device such as a keyboard; 2109, a pointing device such as a mouse; 2110, a bus; 2111, an alarm output device; and 2111, an alarm lamp.

The CPU 2101, the memory 2102, the network interface 2103, the storage 2104, the input interface 2105 and the video interface 2106 are connected through the bus 2110. The monitor 2107 is connected to the bus 2110 through the video interface 2106. The input device 2108 and the pointing device 2109 are connected to the bus 2110 through the input interface 2105. The alarm lamp 2112 is connected to the bus 2110 through the alarm output device 2111. In addition, the network interface 2103 is connected to the transmission line 2002. Further, the network interface 2103 may also be connected to the transmission line 2009 using a public circuit as required. The network interface 2103 and the transmission line 2002 connected thereto constitute an input portion of the reporting apparatus, receiving images from the image storing/distributing apparatus 2004.

Incidentally, the image storing/distributing apparatus 2004, the browser PC 2005, the portable terminal 2012 and the client PC 2013 are different in software (operating programs) installed therein due to a functional difference among them, but they have similar hardware configurations. Each of them may be implemented with a configuration similar to that in FIG. 19.

With reference to FIG. 19, description will be made about a method for image recognition and transmission of monitoring information in the reporting apparatus 2007 in FIG. 18. A program for controlling image recognition, and generation and transmission of monitoring information is stored in the storage 2104. The CPU 2101 loads the program on the memory 2102 and executes the program to control each operation of the reporting apparatus 2007. First, when an image acquisition request to the image storing/distributing apparatus 2004 is inputted from the keyboard 2108, an acquisition command is generated in the CPU 2101, and transmitted to the image storing/distributing apparatus 2004 through the network interface 2103.

The image transmitted from the image storing/distributing apparatus 2004 to the reporting apparatus 2007 in accordance with the image acquisition request is stored in the memory 2102 through the network interface 2103. Incidentally, the image is acquired continuously in accordance with the request. Next, the CPU 2101 performs image recognition well known in the art upon the image. When there is a change in image, the CPU 2101 generates monitoring information and transmits the monitoring information to the client PC 2013 or the portable terminal 2012 through the network interface 2103. When there is the change in image, the CPU 2101 further displays on the monitor 2107 the associated image in which the change is detected or a message to the effect that the change is detected or turns the alarming lamp on.

The monitoring information means 1) at least one of an image acquired by a monitoring camera or the like and the time at which the image is picked up or taken and/or 2) information on detection of a change and so on image by image processing or the like, and conditions of the image processing or the like. Further, the monitoring information may only be 3) a message indicating to the effect that a change in the image or the like is detected.

Figure 1:
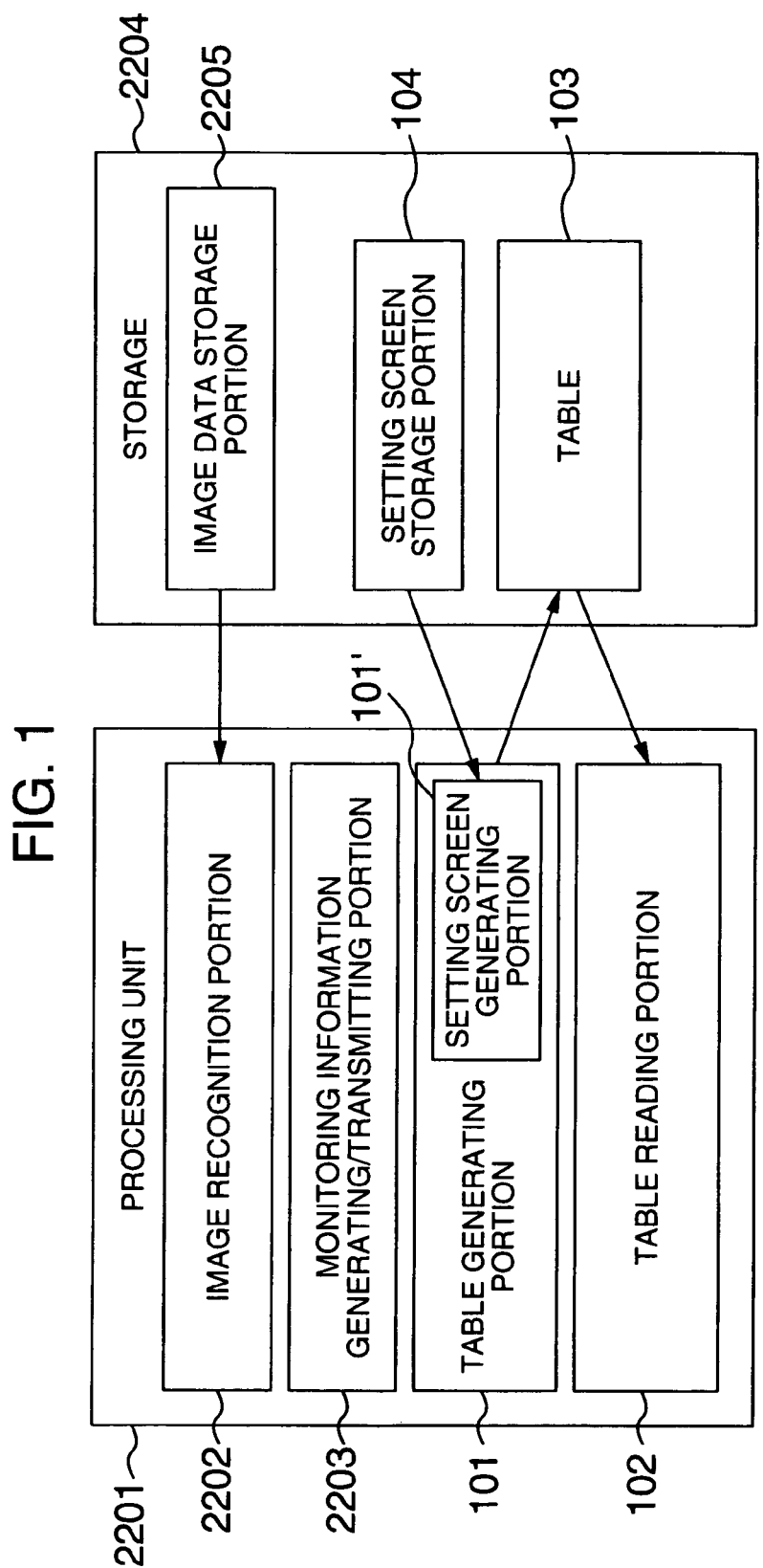
FIG. 1 is a diagram schematically showing an example of a procedure of a reporting apparatus according to the present invention.

FIG. 1 is a schematic diagram for explaining the configuration and operation (procedure) of the reporting apparatus 2007.

In FIG. 1, a storage 2204 is constituted by an image data storage portion 2205, a table 103 and a setting screen storage portion 104. A processing unit 2201 is constituted by an image recognition processing portion 2202, a monitoring information generating/transmitting processing portion 2203, a table generating processing portion 101 and a table reading processing portion 102. The table generating processing portion 101 includes a setting screen generating portion 101'. The table 103 is a memory table for retaining setting data such as a period of time to monitor or a region to be monitored, as will be described later. When the image recognition processing portion (change detecting portion) 2202 is activated, for example, assume that the current time is within the period of time to monitor, which has been set in the table 103, as will be described later. In this case, the image recognition processing portion 2202 reads image data continuously from the image data storage portion 2205, and detects a change between an image read in the past and the latest image, for example, a change in brightness value therebetween. Thus, a moving object or the like is detected.

The monitoring information generating/transmitting processing portion 2203 performs processing as follows. That is, when a moving object or the like is detected as a result of the processing of the image recognition processing portion 2202, the monitoring information generating/transmitting processing portion 2203 generates a message (text) indicating the detection, and monitoring information from the image if necessary, and transmits the message and the monitoring information to the client PC 2013 or the portable terminal 2012. Incidentally, not to say, the processing unit 2201 and the storage 2204 shown in FIG. 1 are constituted by the CPU 2101, the memory 2102, a control program stored in the storage 2104, and so on.

Further, the monitoring information generating/transmitting processing portion 2203 may perform such actions as displaying on the monitor 2107 a resultant image of an intruding object detection or a message indicating detection of an intruding object, turning the alarm lamp 2112 on as required in addition to transmitting the monitoring information to the client PC 2013 or the portable terminal 2012. The actions taken by the monitoring information generating/transmitting processing portion 2203 are not limited to the above, but may include the use of stimulation to eyes, ears, tang, skin or the like of a monitoring person by means of for example a buzzer (not shown) to notify the monitoring person of the detection of a moving object or the like.

The table generating processing portion 101 performs rewriting operation such as creation, change, deletion and the like of the table 103. The table reading processing portion 102 performs a process for reading the table 103 and executing the contents of the table 103. In addition, the table 103 is set by a user making a connection to the reporting apparatus 2007 by use of a Web browser of the browser PC 2005 or the client PC 2013 and operating the table generating processing portion 101. That is, the setting screen generating portion 101' of the table generating processing portion 101 reads, from the setting screen storage portion 104, a setting screen in FIG. 3 which will be described later, and, for example, displays the setting screen on the screen of the client PC 2013. When the user inputs data required for setting the table 103 on the setting screen, the table generating processing portion 101 generates the table 103 as will be described later. The user means a client, a manager of the monitoring system, or the like.

Incidentally, not to say, the processing unit 2201 and the storage 2204 shown in FIG. 1 are constituted by the CPU 2101, the memory 2102, a control program stored in the storage 2104, and so on.

Figure 21:
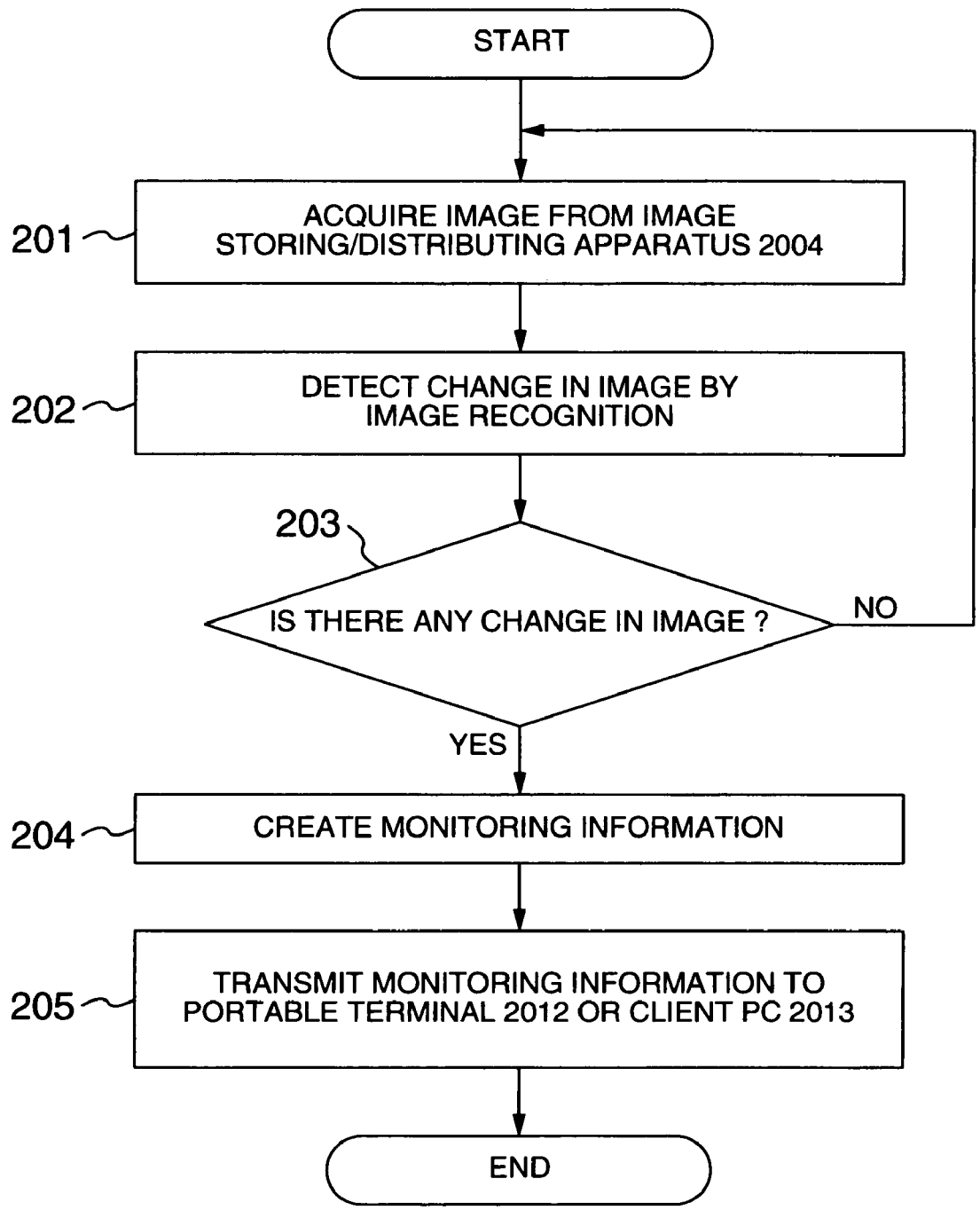
FIG. 21 is a flow chart showing an example of the processing operation of the reporting apparatus.

FIG. 21 is a flow chart showing an example of a change detecting procedure in the reporting apparatus 2007.

In FIG. 21, first the reporting apparatus 2007 acquires a frame of an image from the image storing/distributing apparatus 2004 (Step 201). Next, the image recognition processing portion 2202 compares the currently input image with a previously input image, for example, compares the brightness value of the former with that of the latter, so as to detect a change in image (Step 202).

Next, it is judged whether a change in brightness value not smaller than a predetermined value such as a threshold value has been detected or not (Step 203). When it is concluded as a result of the detection that a change not smaller than the threshold value has been detected, the routine of processing advances to Step 204. When it is concluded that such a change has not been detected, the routine of processing returns to Step 201, executing similar processing upon the next input image.

In Step 204, monitoring information to be transmitted to the portable terminal 2012 or the client PC 2013 is created. Next, the monitoring information created in Step 204 is transmitted to the portable terminal 2012 or the client PC 2013 (Step 205). Incidentally, the aforementioned threshold value is provided for reducing erroneous reports or the like, and the value is determined suitably and experimentally.

With the system described above, the reporting apparatus 2007 can monitor the image of the storing/distributing apparatus 2004 and transmit monitoring information as soon as a moving object is detected.

Note that the notification apparatus 2007 may be adapted to display a resultant image of an intruding object detection or a message indicating detection of the intruding object on the monitor 2107 or turn the alarm lamp 2112 on, instead of executing the steps 204 to 205.

The reporting apparatus 2007 will be described below in more detail with reference to FIGS. 2 to 5.

First, a method for setting a period of time to monitor in the table 103 in the reporting apparatus 2007 shown in FIG. 18 will be described specifically with reference to FIGS. 2 to 4.

Figure 2:
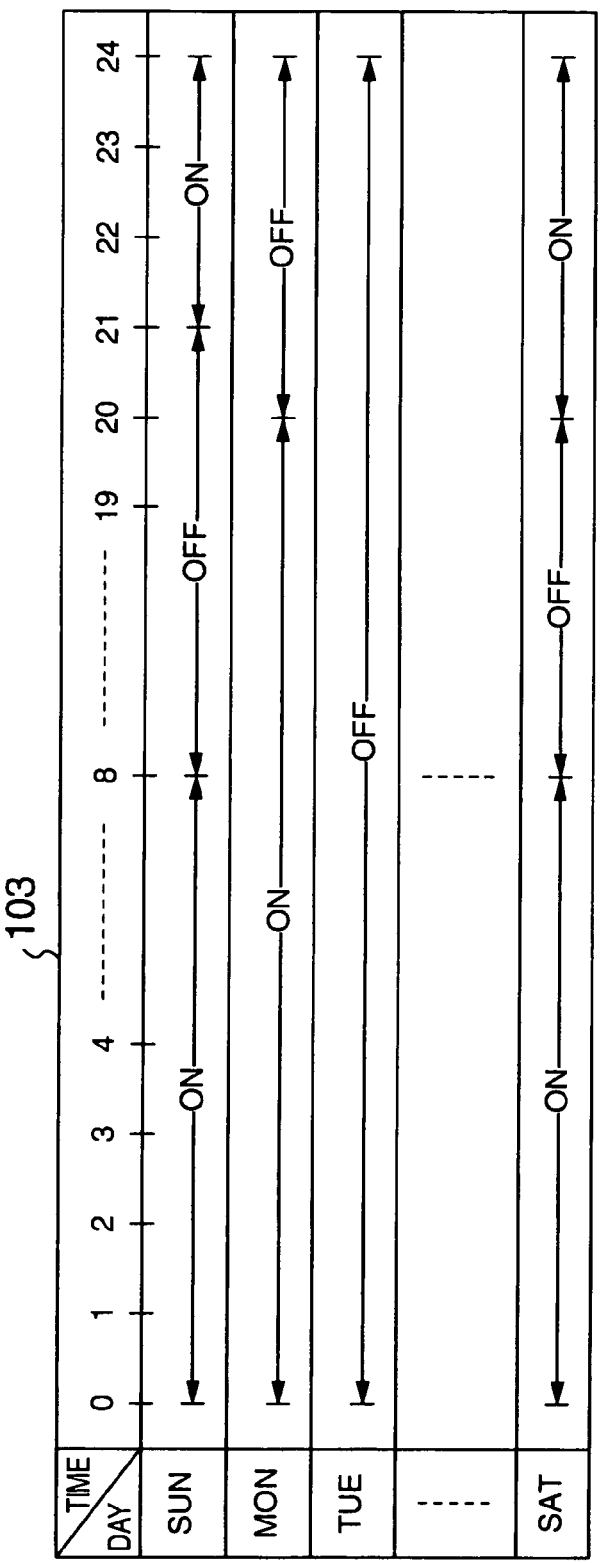
FIG. 2 is a diagram showing an example of a table for setting a monitoring schedule according to the present invention.

FIG. 2 shows an example of the specific contents of the table 103. For example, the table 103 is a table (monitoring schedule table) in which a period of time to monitor is set for each day of the week. That is, ON/OFF setting of daily monitoring is made for each day of the week in such a manner that monitoring on Monday is performed (shown as ON) from zero o'clock to 20 o'clock but not performed (shown as OFF) from 20 o'clock to 24 o'clock. Although this embodiment has been described on the assumption that the table 103 has a table format, the present invention is not limited thereto. The table 103 may have any format if it can be recognized by a computer.

Figure 3:
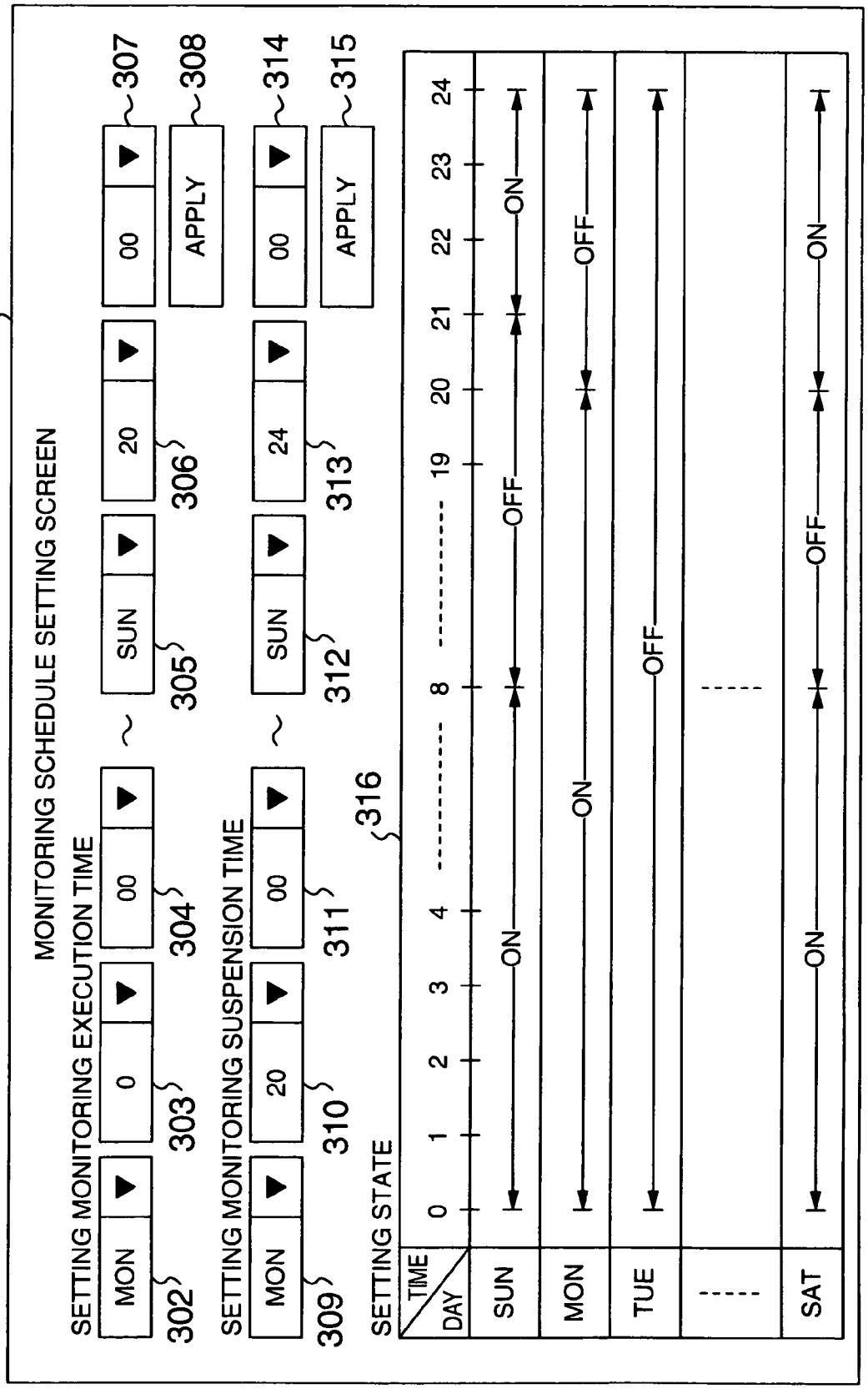
FIG. 3 is a view showing an example of a monitoring schedule setting screen according to the present invention.
Figure 4:
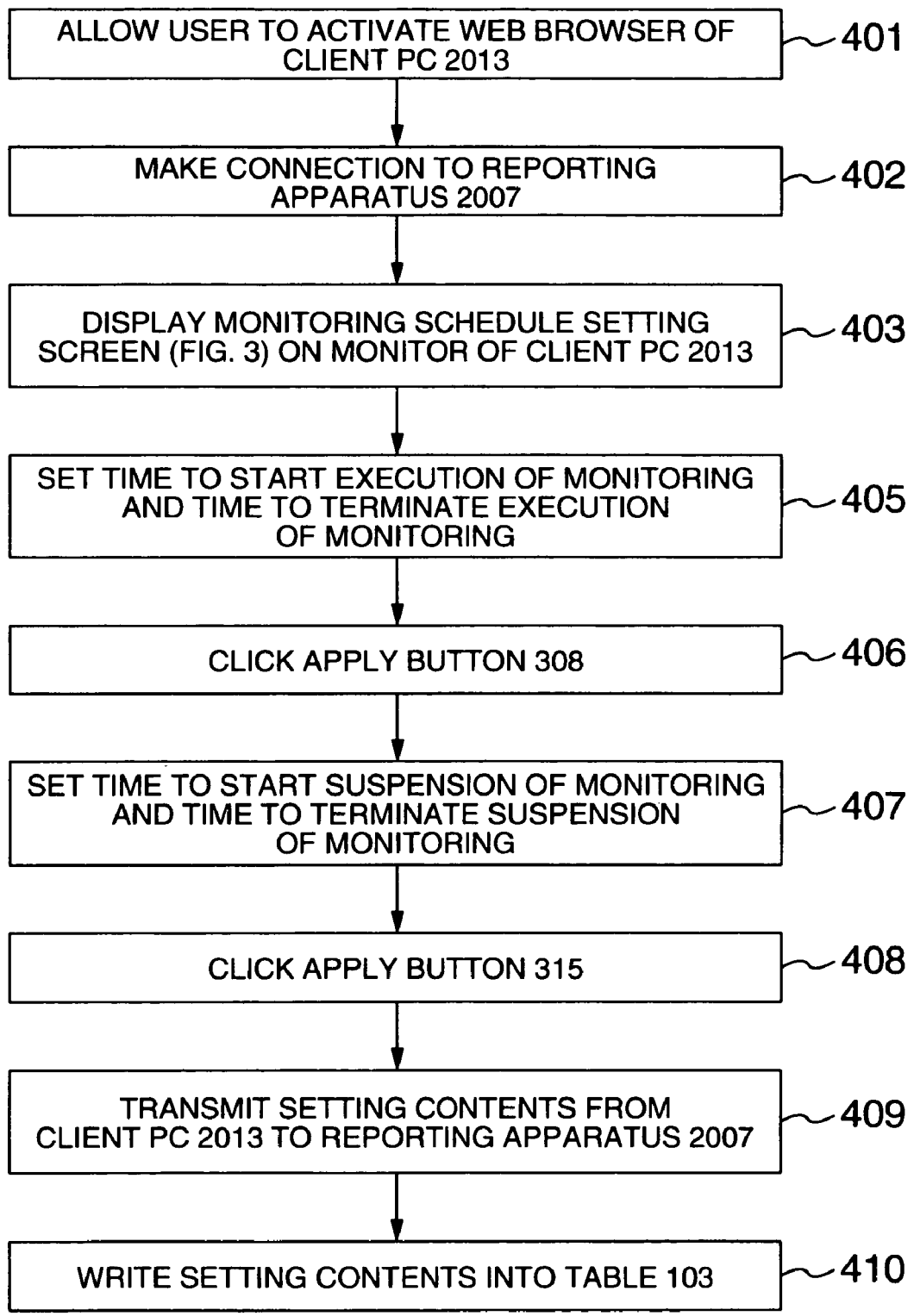
FIG. 4 is a flow chart for explaining an example of a procedure for generating the table according to the present invention.

FIG. 3 shows an example of the setting screen displayed, for example, on the screen of the client PC 2013 when the table generating processing portion 101 of the reporting apparatus 2007 is operated by use of the Web browser of the browser PC 2005 or the client PC 2013. As described above, the setting screen is read from the setting screen storage portion 104 by the setting screen generating portion 101' in the table generating processing portion 101.

When the operator of the monitoring schedule setting screen 301 sets the time to execute monitoring, the operator uses setting boxes 302 to 307 to input the date and time to start the execution of monitoring and the date and time to terminate the execution of monitoring, and clicks an apply button 308. For example, FIG. 3 shows the case where a period of time from 0:00 on Monday to 20:00 on Monday has been inputted as the time to execute monitoring. Incidentally, the clicking operation can be performed by a mouse or the like provided in the browser PC 2005 or the client PC 2013.

In the same manner, when the user sets the time to suspend monitoring, the user uses setting boxes 309 to 314 to input the date and time to start the suspension of monitoring and the date and time to terminate the suspension of monitoring, and clicks an apply button 315. For example, FIG. 3 shows the case where a period of time from 20:00 on Monday to 24:00 on Monday has been inputted as the time to suspend monitoring. When the apply button 308 or 315 is clicked, the state of "ON" or "OFF" in a schedule display area 316 is changed and displayed, while the contents of the setting are transmitted to the reporting apparatus 2007 as a table rewrite request.

Next, an example of the procedure for generating the table 103 using the monitoring schedule setting screen 301 shown in FIG. 3 will be described with reference to the flow chart in FIG. 4. In Step 401, the user starts up the Web browser of the client PC 2013 or the browser PC 2005. In Step 402, the client PC connects with the reporting apparatus 2007 using the browser.

In Step 403, the monitoring schedule setting screen shown in FIG. 3 is displayed on the monitor of the client PC 2013 or the browser PC 2005.

In Step 405, the time to start the execution of monitoring and the time to terminate the execution of monitoring are set. Specifically, the user selects a desired time from a list in each setting box 302-307. In Step 406, the user clicks the apply button 308 to complete the setting. In Step 407, the time to start the suspension of monitoring and the time to terminate the suspension of monitoring are set. Specifically, the user selects a desired time from a list in each setting box 309-314. In Step 408, the user clicks the apply button 315 to complete the setting.

In Step 409, the contents of the afore-mentioned settings are transmitted as a table rewrite request from the client PC 2013 or the browser PC 2005 to the reporting apparatus 2007.

In Step 410, the table generating processing portion 101 rewrites the table 103 with the received setting contents in accordance with the table rewrite request. In the procedure described above, the table 103 for retaining setting data of a period of time to monitor is generated.

Figure 5:
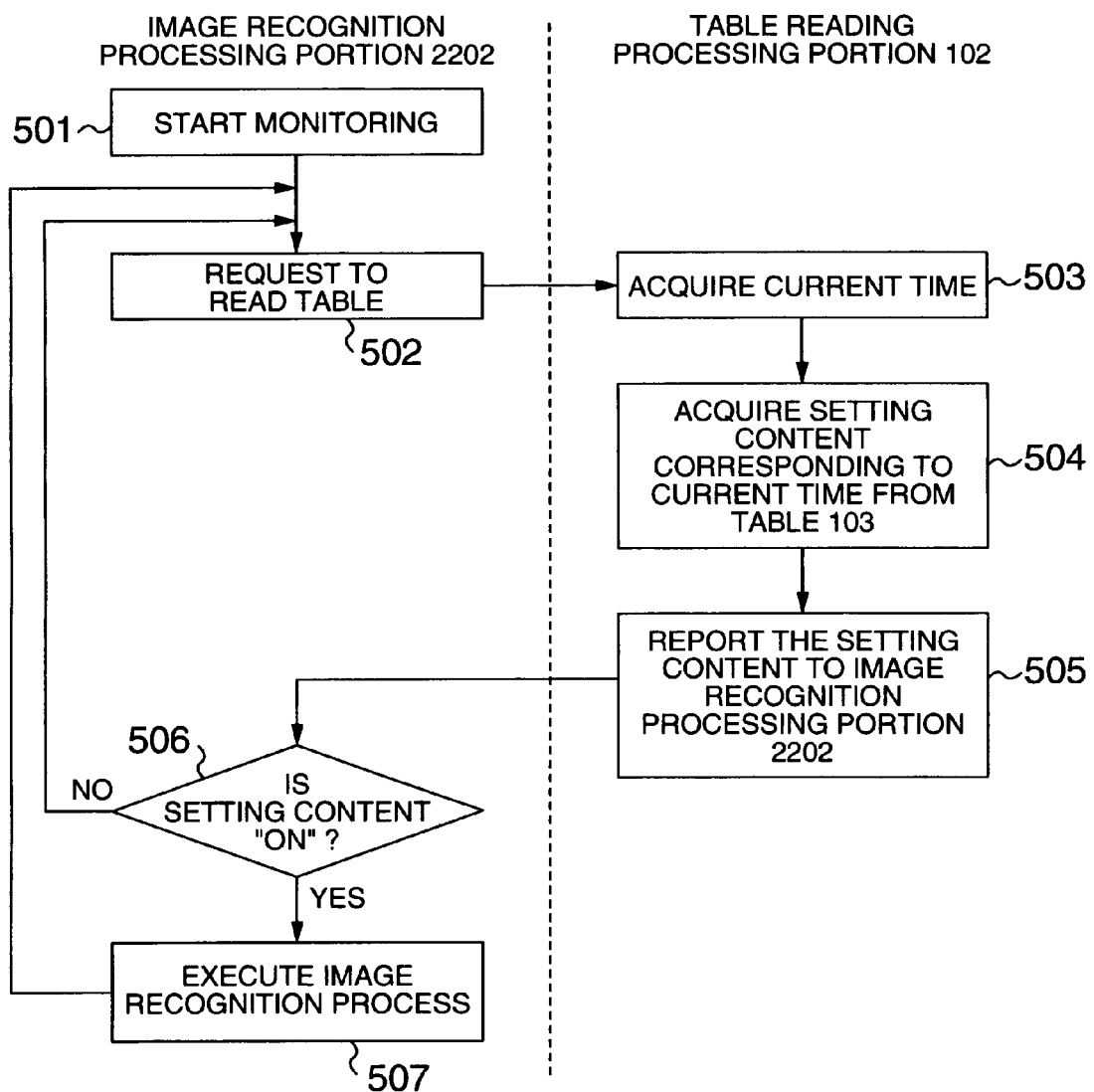
FIG. 5 is a flow chart for explaining an example of an image recognition process according to the present invention.

Next, an example of the operation of the image recognition processing portion 2202 of the reporting apparatus 2007 using the table 103 in FIG. 2 will be described with reference to the flow chart in FIG. 5. In Step 501, the image recognition processing portion 2202 is activated to start monitoring. In Step 502, the image recognition processing portion 2202 makes a request to the table reading processing portion 102 for a process for reading the table. In Step 503, the table reading processing portion 102 acquires the current time.

In Step 504, the table reading processing portion 102 acquires the setting contents corresponding to the current time, for example, the time to execute monitoring or the time to suspend monitoring, from the table 103. In Step 505, the table reading processing portion 102 notifies the image recognition processing portion 2202 of the setting contents.

In Step 506, the image recognition processing portion 2202 judges whether the contents of the notification indicate "ON" or "OFF". When the contents indicate "ON", the routine of processing advances to Step 507. When the contents indicate "OFF", the routine of processing returns to Step 502 without executing the image recognition process. In Step 507, the image recognition processing portion 2202 executes the image recognition process.

With the procedure described above, the execution period of time of the image recognition processing portion 2202 can be controlled. Incidentally, during an "OFF" period of time, the image acquisition request (concerned with an image of the corresponding monitoring camera 2001) from the reporting apparatus 2007 to the image storing/distributing apparatus 2004 is also suspended, and no image is transmitted from the image storing/distributing apparatus 2004 to the reporting apparatus 2007.

Incidentally, description has been made about one table in this embodiment. However, when different monitoring schedules are set for respective ones of images taken by a plurality of monitoring cameras 2001, the images taken by the monitoring cameras 2001 can be monitored in accordance with the different schedules by providing a plurality of tables.

Figure 7:
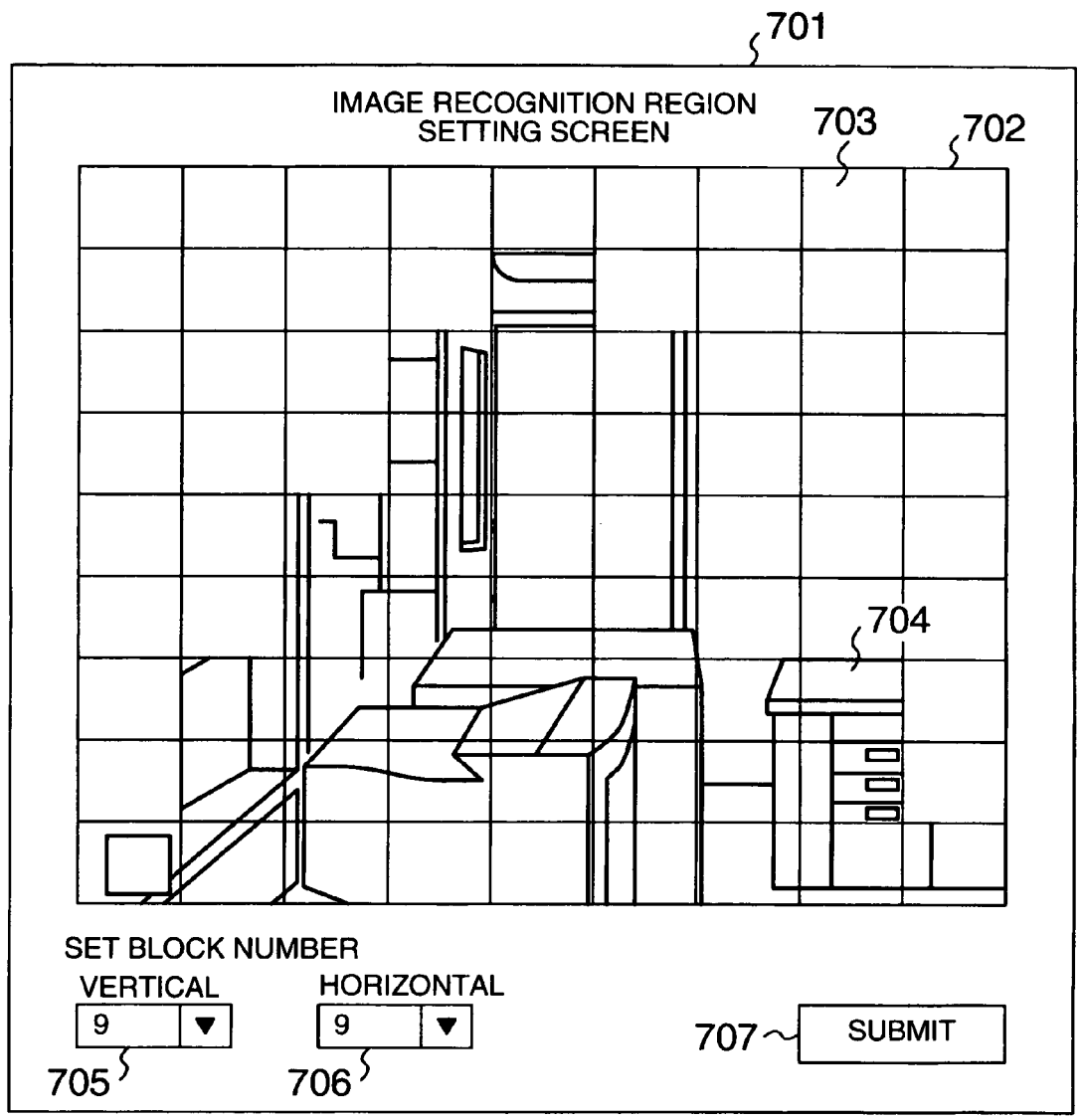
FIG. 7 is a diagram showing an example of a screen for setting the image recognition regions according to the present invention.
Figure 8:
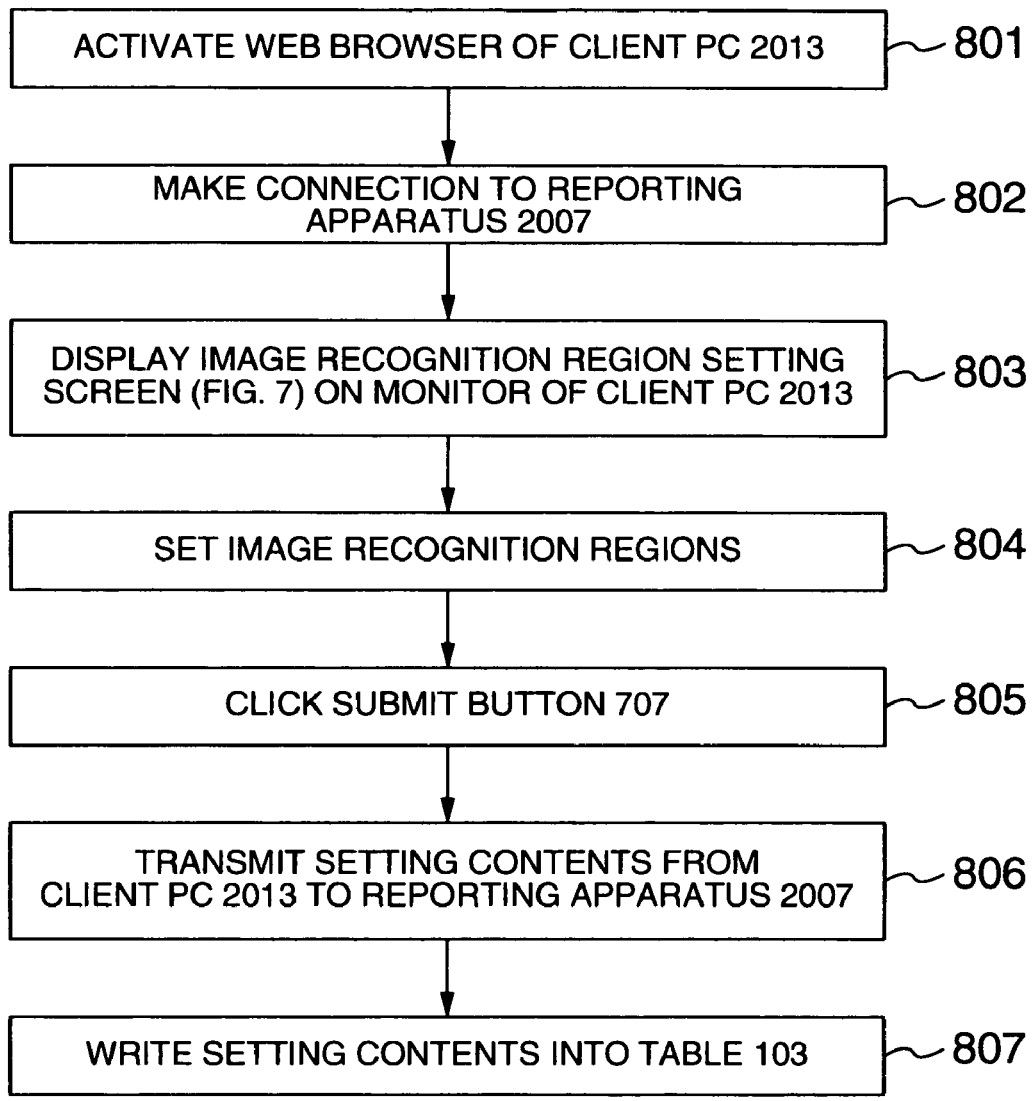
FIG. 8 is a flow chart for explaining an example of a procedure for generating the table according to the present invention.

Next, another embodiment of the present invention will be described with reference to FIGS. 6 to 8. FIGS. 6 to 8 are diagrams for explaining a method for setting to-be-image-recognized regions in the table 103 in the reporting apparatus 2007 shown in FIG. 18.

FIG. 6 shows an example of the table 103 (image recognition region schedule table) having a function different from the function of setting the ON/OFF state of monitoring as described in FIG. 2, that is, a function of setting a to-be-image-recognized region. FIG. 6 shows a data table indicating whether to perform image recognition on each of blocks which are divisions of an image photographed by the monitoring camera 2001. Here, the region made of blocks labeled "ON" is a to-be-image-recognized block, while the region made of blocks labeled "OFF" is a not-to-be-image-recognized block (masked region).

FIG. 7 shows an example of an image recognition region setting screen 701 to be displayed, for example, on the screen of the client PC 2013, when the table generating processing portion 101 of the reporting apparatus 2007 is operated using the Web browser of the browser PC 2005 or the client PC 2013. As described above, the setting screen is read from the setting screen storage portion 104 by the setting screen generating portion 101' in the table generating processing portion 101.

When the user activates the image recognition region setting screen 701, an image recognition region selection screen 702 is displayed on the screen. The image recognition region selection screen 702 is divided into some blocks. When one of the blocks is clicked, the selection state of the block is changed. That is, whenever a block is clicked, the state of the block is switched between the state (ON state) of a to-be-image-recognized block 704 and the state (OFF state) of a not-to-be-image-recognized block 703.

Incidentally, the to-be-image-recognized blocks 704 in FIG. 7 display an image of a given camera of the monitoring cameras 2001. For example, when the screen 701 is displayed on the Web browser, the table generating processing portion 101 makes a request to the image storing/distributing apparatus 2004, acquires an image of one of the monitoring cameras 2001, and displays the image on the image recognition region selection screen 702. The to-be-image-recognized blocks 704 and the not-to-be-image-recognized blocks 703 are displayed in distinction from each other. For example, the not-to-be-image-recognized blocks 703 are displayed in white. The display mode is not limited thereto, but another display mode may be adopted. For example, the frame color of each block may be changed (for example, the frame of each to-be-image-recognized block 704 is displayed in red).

When the user clicks a submit (transmit) button 707, the contents of the image recognition regions set in the screen 702 are reported as a table rewrite request to the table generating processing portion 101. Thus, of the image, only necessary regions can be monitored, as will be described later. In addition, not to say, different image recognition regions can be set in accordance with the image of each camera of the monitoring cameras 2001.

Further, in the image recognition region setting screen 701, the vertical block number and the horizontal block number can be inputted using setting boxes 705 and 706 respectively, so as to set the number of blocks divided in the image recognition region selection screen 702. In FIG. 7, "9" and "9" are inputted into the setting boxes 705 and 706 respectively. Thus, the image recognition region selection screen 702 is divided into 9 blocks vertically by 9 blocks horizontally, that is, a total of 81 blocks.

Here, when the number of blocks divided in the image recognition region selection screen 702 is increased, the user can do more minute setting so that the accuracy of image recognition increases. However, when the number of divided blocks is increased, the processing time in image recognition increases. Although the vertical and horizontal block numbers are specified to change the number of blocks in the image recognition region selection screen 702, this embodiment is not limited thereto. For example, the size (height and width) of one block may be specified.

To-be-image-recognized blocks and not-to-be-image-recognized blocks are set in the image recognition region setting screen 701 shown in FIG. 7. Further, threshold values or the like for image recognition can be changed in accordance with each block. For example, detection sensitivity may be increased for a block having a high frequency of occurrence of a moving object so that detection accuracy can be increased. The threshold values are stored in the table 103 in accordance with each block.

Next, an example of the procedure for creating the table 103 using the image recognition region setting screen 701 shown in FIG. 7 will be described with reference to the flow chart of FIG. 8. In Step 801, the user activates the Web browser of the client PC 2013 or the browser PC 2005. In Step 802, the client PC 2013 or the browser PC 2005 makes a connection to the reporting apparatus 2007.

In Step 803, the image recognition region setting screen 701 is displayed on the client PC 2013 or the browser PC 2005. In Step 804, the user sets a to-be-image-recognized region. The method for setting the region follows the aforementioned one. That is, a block displayed on the image recognition region selection screen 702 is clicked with a mouse so that a to-be-image-recognized block 704 or a not-to-be-image-recognized block 703 is selected. Thus, region setting is done. When desired image recognition regions are obtained, the routine of processing advances to Step 805.

In Step 805, the user clicks the submit button 707 and completes the setting. In Step 806, the contents of the image recognition regions set in Step 804 are transmitted as a table rewrite request from the client PC 2013 or the browser PC 2005 to the reporting apparatus 2007.

In Step 807, the table generating processing portion 101 writes the received setting contents into the table 103 in accordance with the table rewrite request. In the procedure described above, the table 103 for retaining the setting data of image recognition regions is generated.

Figure 9:
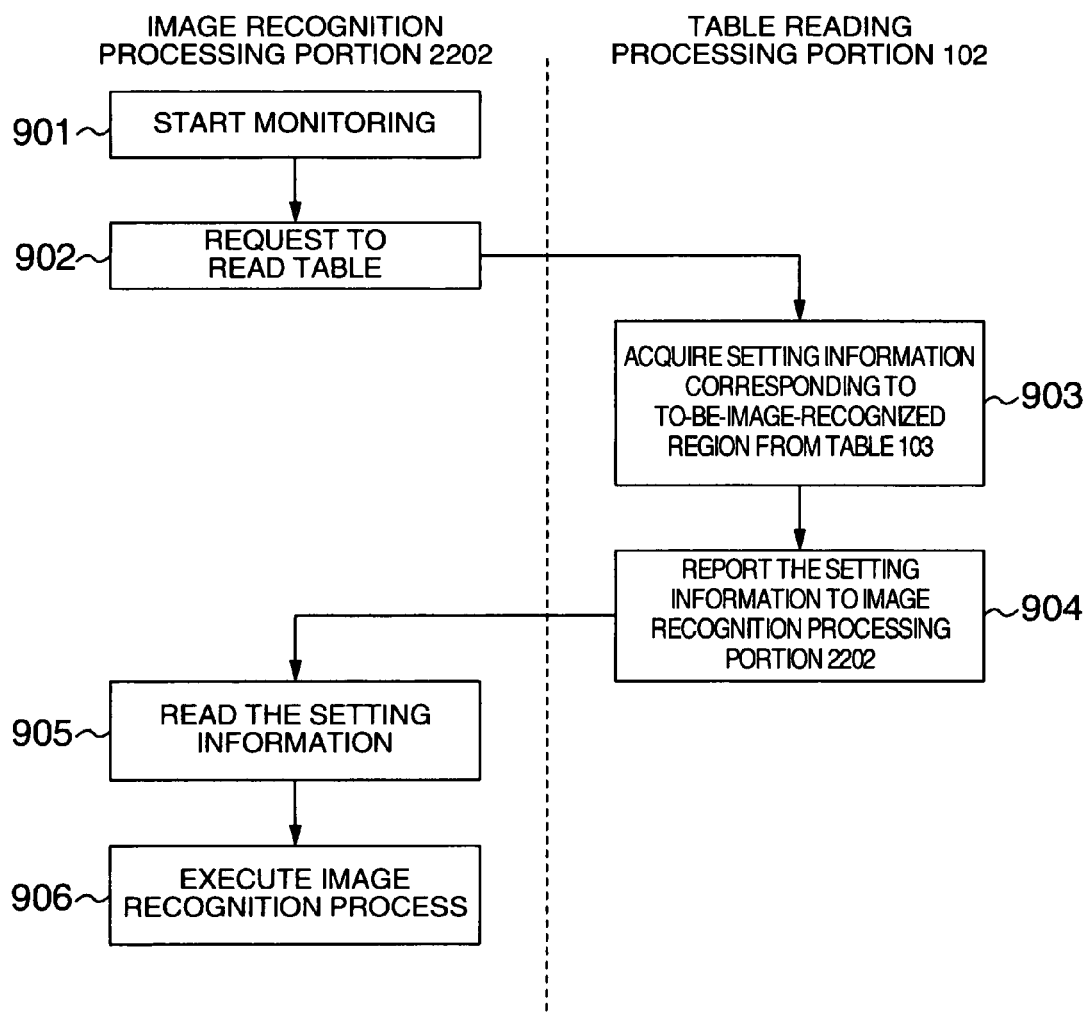
FIG. 9 is a flow chart for explaining an example of an image recognition process according to the present invention.

Next, an example of the operation of the image recognition processing portion 2202 of the reporting apparatus 2007 using the table 103 will be described with reference to the flow chart of FIG. 9. In Step 901, the image recognition processing portion 2202 is activated to start monitoring. In Step 902, the image recognition processing portion 2202 makes a request to the table reading processing portion 102 for a table reading process.

In Step 903, the table reading processing portion 102 reads and acquires the ON/OFF setting information for image recognition, which information has been written in the table 103. In Step 904, the table reading processing portion 102 reports the setting information to the image recognition processing portion 2202.

In Step 905, the image recognition processing portion 2202 reads the setting information reported in Step 904, so as to acquire the setting information about the to-be-image-recognized region. In Step 906, the image recognition processing portion 2202 executes an image recognition process in accordance with the setting information acquired in Step 905.

In the procedure described above, an image recognition process is executed on blocks displayed as ON in accordance with the setting in the table 103. Incidentally, description in this embodiment has been made about one table. However, a plurality of tables in which different image recognition regions have been set for a plurality of monitoring cameras 2001 individually may be provided. In this case, an image recognition process can be performed on regions differing from one monitoring camera to another.

As has been described above, according to the present invention, when an image recognition region schedule table provided in the table 103 is used, the ON/OFF state of monitoring can be changed in accordance with time. As a result, the trouble of turning on/off the power manually can be eliminated.

When images from a plurality of monitoring cameras 2001 are monitored on a single reporting apparatus 2007, a plurality of monitoring processes 2201 are activated in accordance with a plurality of different monitoring schedule tables. Since the monitoring processes 2201 unnecessary to monitor can be suspended or resumed, the resources of the reporting apparatus 2007 such as the CPU 2101 or the memory 2102 can be used effectively.

When a table indicating a to-be-image-recognized region is provided in the table 103, image recognition can be performed on only a necessary region of the image of the monitoring camera 2001 as a target of monitoring. Thus, detection of unnecessary regions (that is, erroneous detection) can be reduced so that the efficiency in monitoring can be improved. For example, assume that the vicinity of an entrance of a building is being widely photographed with the monitoring camera 2001. In such a case, when only the entrance is set as the region to be monitored, only a change in comings and goings via the entrance can be detected. That is, the resources of the reporting apparatus 2007 such as the CPU 2101 or the memory 2102 can be used effectively, and detection can be also accelerated.

Next, another embodiment of the present invention will be described with reference to FIGS. 10 to 14 and FIG. 17. FIGS. 10 to 14 and FIG. 17 are views for explaining the embodiment in which the method for using the table 103 for setting the schedule and the method for using the table 103 for setting a region to be image-recognized are combined so that the region to be image-recognized can be changed in accordance with a period of time.

Figure 10:
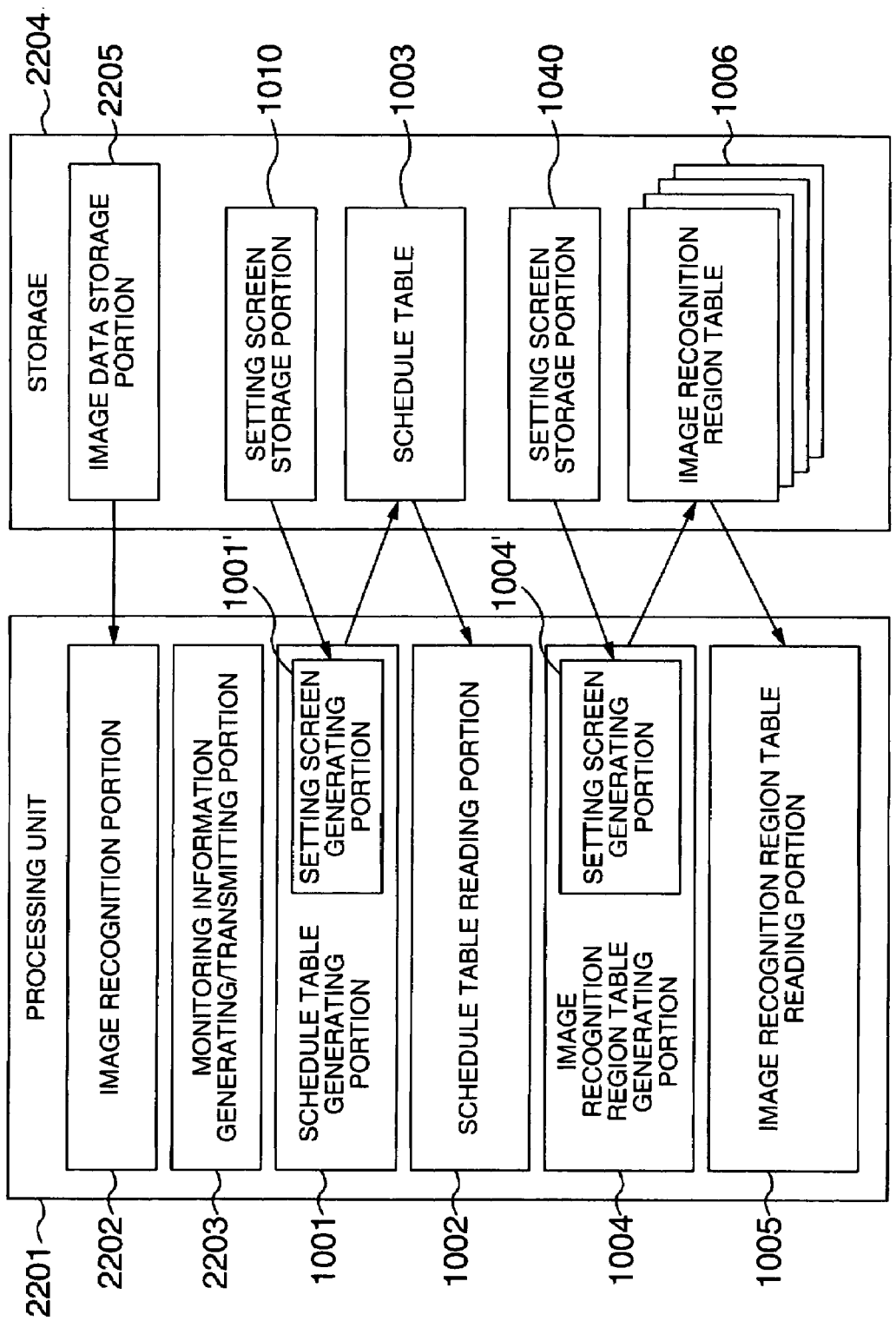
FIG. 10 is a diagram schematically showing an example of a procedure of a reporting apparatus according to the present invention.

FIG. 10 is a diagram schematically showing the configuration and operation (procedure) of the reporting apparatus 2007 in this embodiment. FIG. 10 is the same as the configuration diagram shown in FIG. 1, except the following points. That is, a set of a table generating processing portion 1001 and a table reading processing portion 1002 are provided for scheduling, and another set of a table generating processing portion 1004 and a table reading processing portion 1005 are provided for image recognition regions. As for tables, in the same manner, a schedule table 1003 and image recognition region tables 1006 are provided. Further, setting screen storage portions 1010 and 1040 are provided in the storage 2204. Correspondingly to the setting screen storage portions 1010 and 1040, the table generating processing portions 1001 and 1004 include setting screen generating portions 1001' and 1004' respectively.

In addition, there are a plurality of image recognition region tables 1006. For example, in addition to the table shown in FIG. 6, a table where a to-be-image-recognized region has been set in different blocks from those in FIG. 6 is provided as shown in FIG. 17. Not to say, when different schedules are set for a plurality of monitoring cameras 2001 individually, a plurality of schedule tables 1003 are provided.

Figure 11:
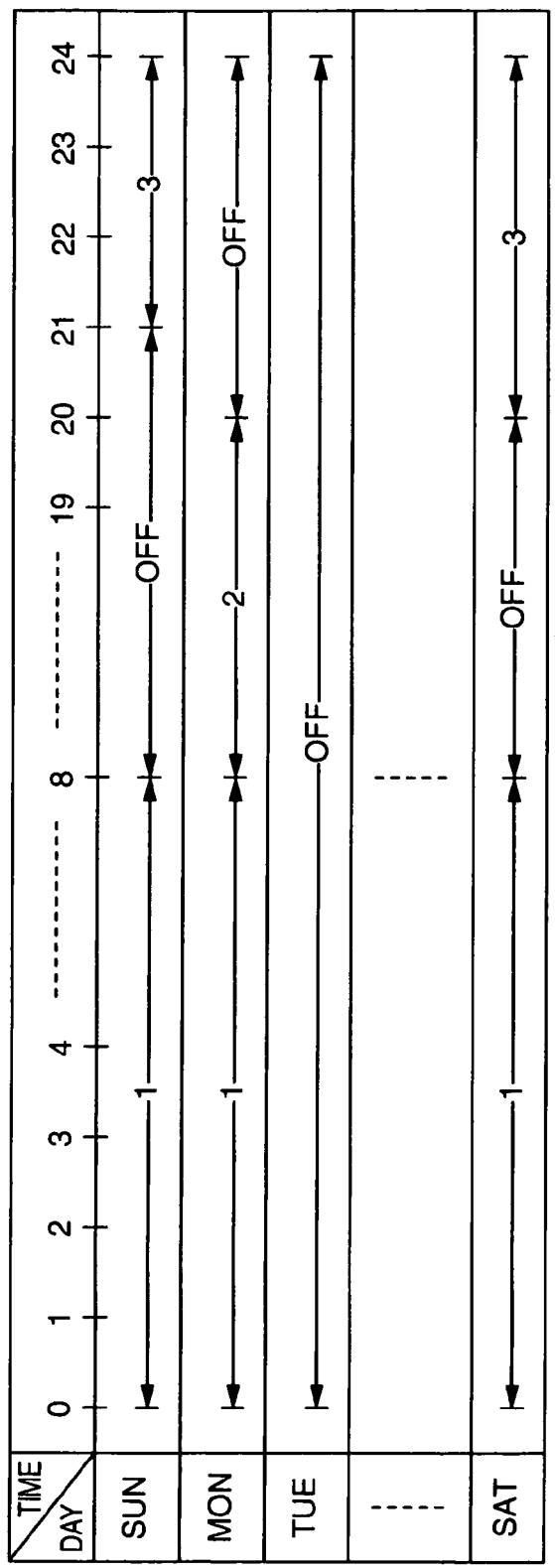
FIG. 11 is a diagram showing an example of a table for setting a monitoring schedule according to the present invention.

FIG. 11 shows an example of specific contents of the schedule table 1003. That is, each period of time to monitor and the number of an image recognition region table 1006 to be used in the period of time to monitor are set. Here, "OFF" indicates that monitoring is not to be performed in that period in the same manner as in FIG. 2, and each numeral "1", "2", "3" indicates the number of the image recognition region table 1006 used in the period of time to mount.

For example, image recognition regions shown in FIG. 6 have been set in the image recognition region table 1006 specified by "1", and image recognition regions shown in FIG. 17 have been set in the image recognition region table 1006 specified by "2". Further different image recognition regions (not shown) have been set in the image recognition region table 1006 specified by "3". Thus, the region to be image-recognized can be changed in accordance with each period of time.

Figure 12:
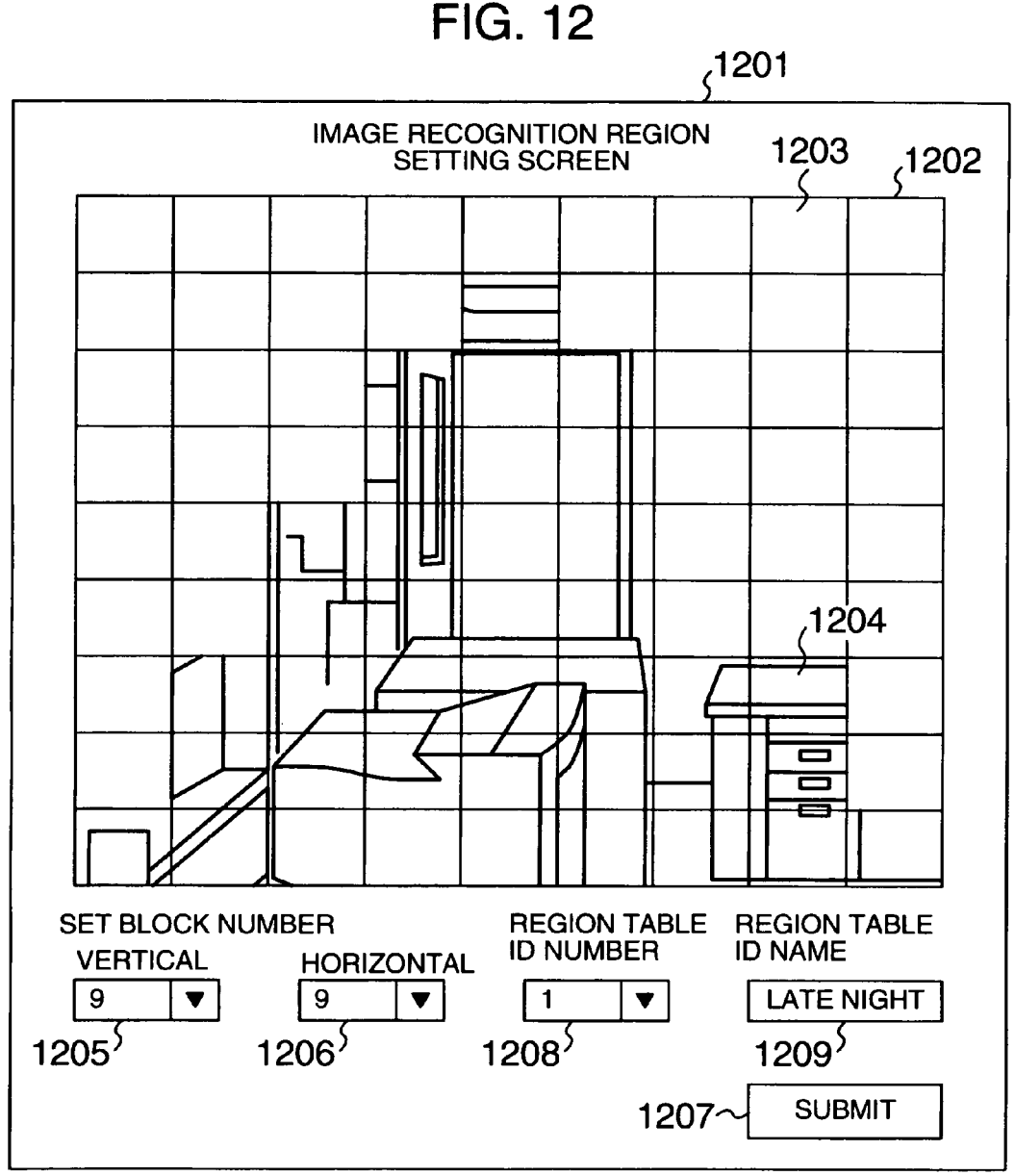
FIG. 12 is a diagram showing an example of a screen for setting image recognition regions according to the present invention.

FIG. 12 shows an example of an image recognition region setting screen displayed, for example, on the screen of the client PC 2013, when the image recognition region table generating processing portion 1004 of the reporting apparatus 2007 is operated using the Web browser of the browser PC 2005 or the client PC 2013. The setting screen is read from the image recognition region setting screen storage portion 1040 by the setting screen generating portion 1004' in the table generating processing portion 1004. FIG. 12 is similar to FIG. 7, but it has another additional function.

The reference numeral 1208 represents a setting box for setting an identification number of the image recognition region table 1006; and 1209, an input box for setting an identification name that can be set in connection with the number specified in the setting box 1208. The user selects an identification number in the setting box 1208 and inputs an identification name in the input box 1209. When the user then clicks a submit (transmit) button 1207, the contents of the image recognition regions set in the screen 1202 are reported as a table rewrite request to the image recognition region table generating processing portion 1004.

Here, in the image recognition region setting screen 1201 shown in FIG. 12, "1" and "late night" are inputted in the setting box 1208 and the input box 1209. Accordingly, an image recognition region table 1006 identified by "1: late night" is generated by the image recognition region table generating processing portion 1004. In the same manner, for example, image recognition region tables 1006 identified by "2: daytime" and "3: night" respectively and having image recognition regions set differently from those in "1: late night" are created.

Thus, for example, when the region to be monitored is changed in accordance with each period of time, an identification name according to the period of time can be set for each of the image recognition region tables 1006 in which different regions have been set.

Figure 13:
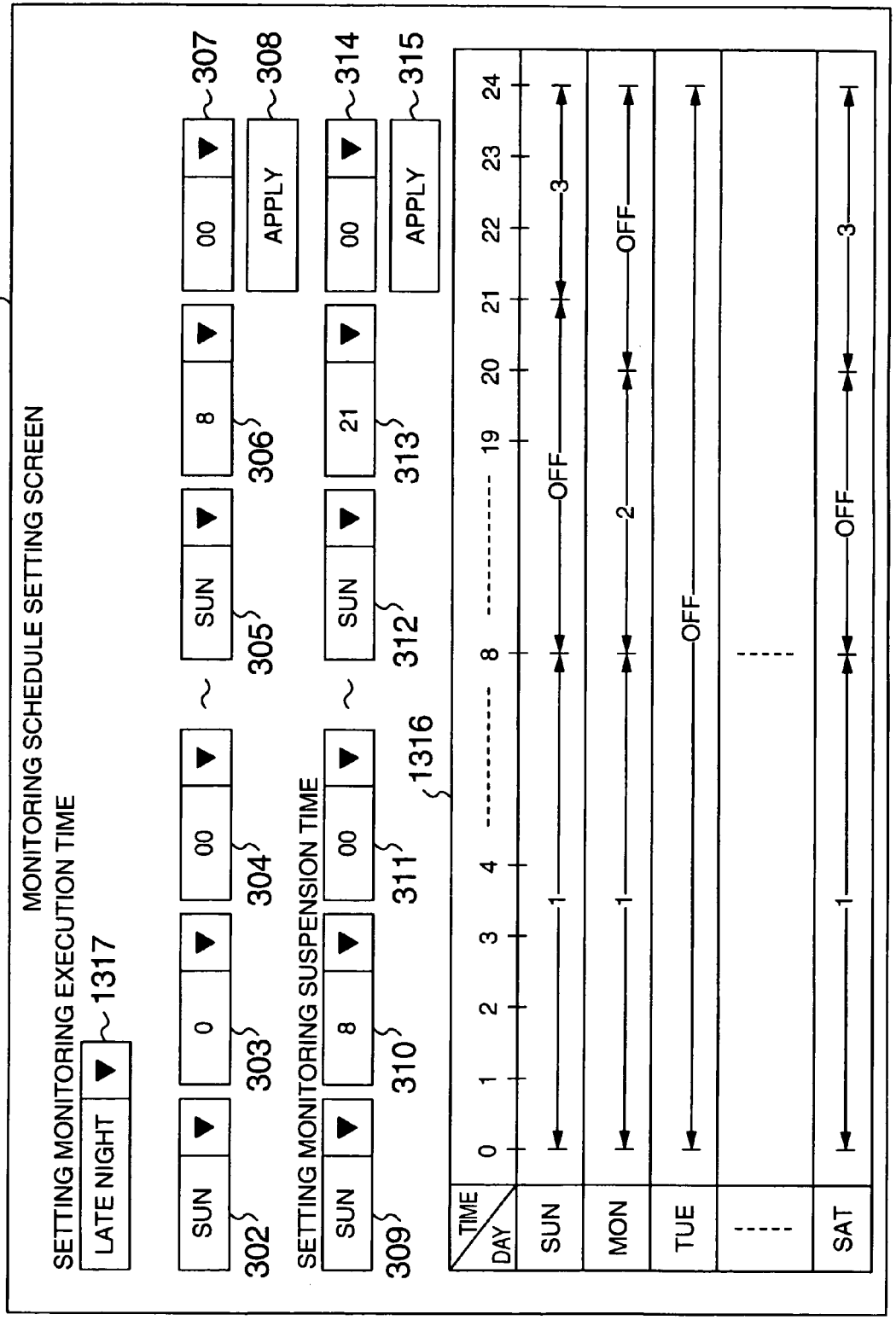
FIG. 13 is a view showing an example of a monitoring schedule setting screen according to the present invention.

FIG. 13 shows an example of a setting screen acquired from the setting screen storage portion 1010 in the storage 2204 by the setting screen generating portion 1001' and displayed, for example, on the screen of the client PC 2013, when the schedule table generating processing portion 1001 of the reporting apparatus 2007 is operated using the Web browser of the browser PC 2005 or the client PC 2013. FIG. 13 is similar to FIG. 3, but it has another additional function.

The reference numeral 1317 represents a setting box for specifying one of the plurality of image recognition region tables 1006. Accordingly, in the monitoring schedule setting screen 1301, when a period of time to perform monitoring is set, an image recognition region table 1006 to be read by the image recognition processing portion 2202 in that period of time can be specified together.

Here, one of "1: late night", "2: daytime" and "3: night" can be selected in the setting box 1317. In such a manner, the monitoring schedule setting screen 1301 displays the identification names (for example, "late night", "daytime", "night", etc.) set by the operator as well as a list (1-3) of the identification numbers of the image recognition region tables 1006. Thus, it is possible to specify one of the image recognition region tables 1006 in each period of time easily.

For example, FIG. 13 shows the case where a period from 0:00 on Sunday to 8:00 on Sunday is inputted as the time to perform monitoring, and "1: late night" is further inputted as the image recognition region table 1006 to be used in that period of time.

Figure 22:
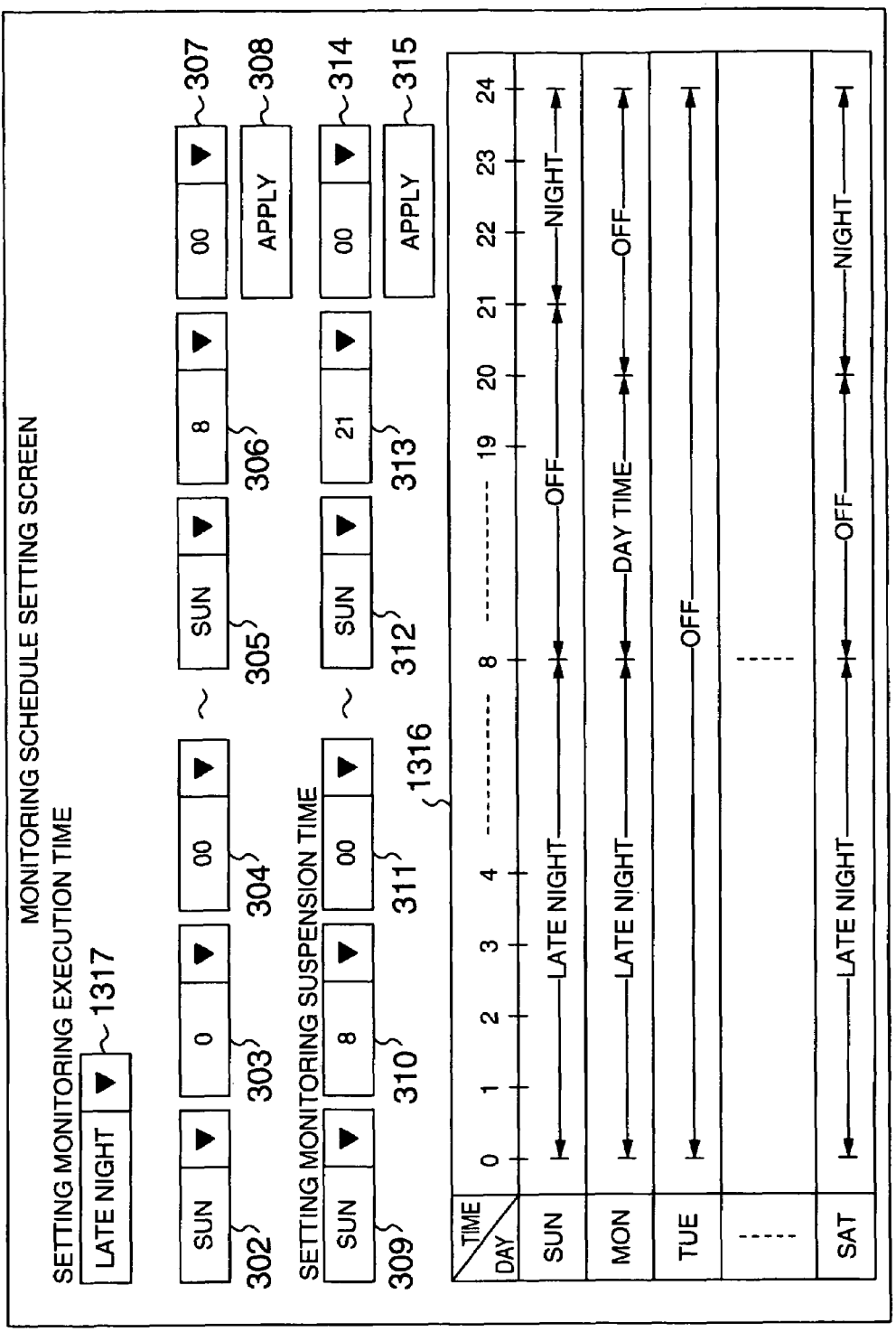
FIG. 22 is a view showing another example of a monitoring schedule setting screen according to the present invention.

In FIG. 13 identification numbers of the image recognition region tables 1006 used in respective time periods are displayed in a schedule display area 1316. Alternatively, identification names of the image recognition region tables 1006 used in respective time periods may be displayed in the schedule display area 1316, as shown in FIG. 22. It is a mater of course that both identification numbers and identification names of the image recognition region tables 1006 used in respective time periods may be displayed in the schedule display area 1316.

Figure 14:
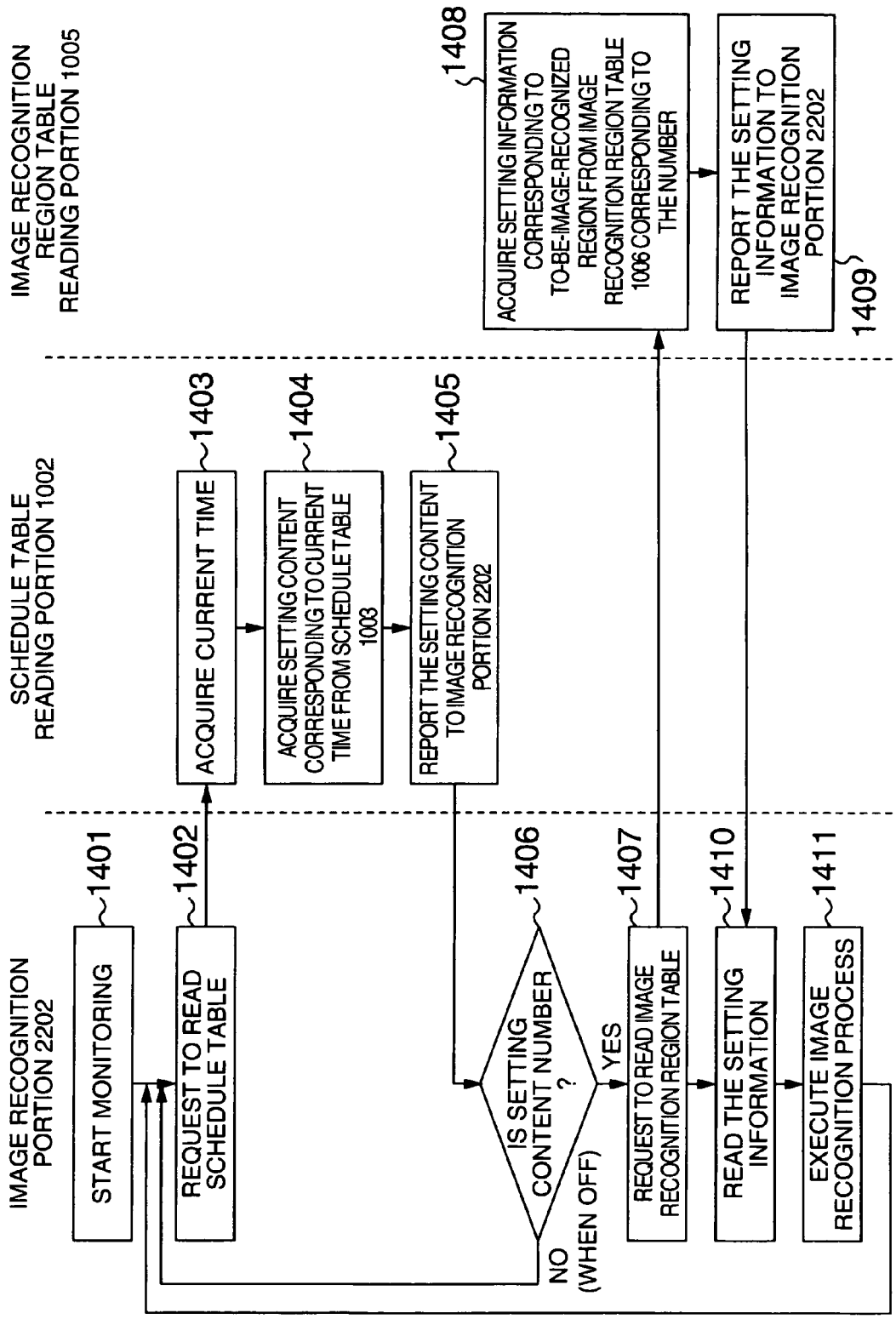
FIG. 14 is a flow chart for explaining an example of an image recognition process according to the present invention.

Next, an example of the operation of the image recognition processing portion 2202 of the reporting apparatus 2007 using the schedule table 1003 and the image recognition region tables 1006 will be described with reference to the flow chart of FIG. 14. In Step 1401, the image recognition processing portion 2202 is activated to start monitoring. In Step 1402, the image recognition processing portion 2202 makes a request to the schedule table reading processing portion 1002 for a process for reading the schedule table 1003.

In Step 1403, the schedule table reading processing portion 1002 acquires current time. In Step 1404, the schedule table reading processing portion 1002 acquires the setting content corresponding to the current time from the schedule table 1003. For example, the setting content is the number of the image recognition region table 1006 (time to perform monitoring), or the time to suspend monitoring.

In Step 1405, the schedule table reading processing portion 1002 reports the setting content to the image recognition processing portion 2202. In Step 1406, the image recognition processing portion 2202 judges whether the reported content is a number or "OFF. When the setting content corresponding to the current time is "OFF", the routine of processing returns to Step 1402. When the setting content is a number 1-3, the image recognition region table 1006 corresponding to the number is grasped. Then, the routine of processing advances to Step 1407.

In Step 1407, the image recognition processing portion 2202 makes a request to the image recognition region table reading processing portion 1005 for a process for reading the image recognition region table 1006. In Step 1408, the image recognition region table reading processing portion 1005 reads and acquires image recognition ON/OFF setting information written in the grasped image recognition region table 1006 corresponding to the aforementioned number. In Step 1409, the image recognition region table reading processing portion 1005 reports the setting information to the image recognition processing portion 2202.

In Step 1410, the image recognition processing portion 2202 reads the setting information reported in Step 1409, and acquires the setting information about a region to be image-recognized. In Step 1411, the image recognition processing portion 2202 performs an image recognition process in accordance with the setting information acquired in Step 1410. When the image recognition process is terminated, the routine of processing returns to Step 1402, continuing monitoring.

In the procedure described above, an image recognition process is performed on a to-be-image-recognized region (blocks displayed as "ON") changed in accordance with each period of time.

As has been described above, the numbers of the image recognition region tables 1006 are prepared in the schedule table 1003 so that the to-be-image-recognized region can be changed in accordance with each period of time. Thus, even when the region to be monitored changes in accordance with each period of time, monitoring can be performed efficiently.

Figure 16:
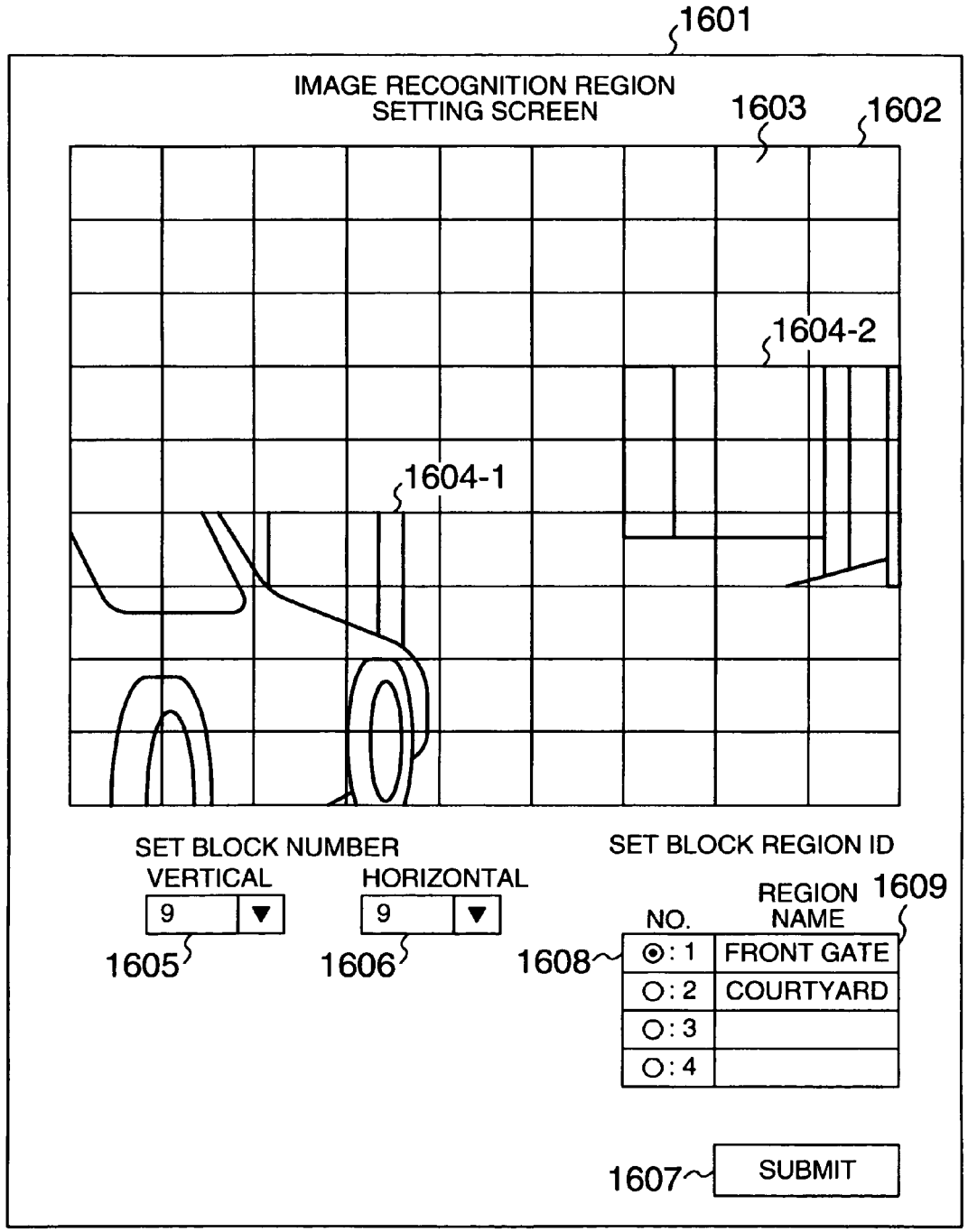
FIG. 16 is a diagram showing an example of a screen for setting the image recognition regions according to the present invention.

Next, another embodiment of the present invention will be described with reference to FIGS. 15 and 16. FIGS. 15 and 16 are diagrams for explaining the embodiment in which information for allowing the client PC 2013 or the portable terminal 2012 receiving monitoring information to specify a monitored location is added to the monitoring information and transmitted together therewith.

FIG. 15 shows an example of the specific contents of a table (image recognition region schedule) in which regions to be image-recognized have been set. In FIG. 15, there are two to-be-image-recognized regions composed of "ON" blocks, that is, a block region 1501 and a block region 1502.

Here, assume that a moving object or the like was detected as a result of processing by the image recognition processing portion 2202 of the reporting apparatus 2007. In such a case, when there is no information for specifically distinguishing between the region 1501 and the region 1502, the monitoring information generated by the monitoring information generating/transmitting processing portion 2203 is limited to the content "a moving object was detected in the region 1" or "a moving object was detected in the region 2". Therefore, for the user who is an operator of the client PC 2013 or the portable terminal 2012 receiving the monitoring information, it is difficult to viscerally grasp the situation means by the region 1 or the region 2.

FIG. 16 shows an example of an image recognition region setting screen displayed, for example, on the screen of the client PC 2013, when the table generating processing portion 101 of the reporting apparatus 2007 is operated using the Web browser of the browser PC 2005 or the client PC 2013. The setting screen is read from the setting screen storage portion 104 by the setting screen generating portion 101' in the table generating processing portion 101. FIG. 16 is similar to FIG. 7, but it has another additional function. Here, the reference numeral 1608 represents a check box for specifying the number of a block region (composed of at least one divided block); and 1609, an input box for setting the name of the block region.

Assume that blocks of an image recognition region selection screen 1602 are clicked to be in a to-be-image-recognized state (ON state) when one number has been selected in the check box 1608. In this event, those blocks are set as blocks belonging to one and the same block region. Likewise, assume that blocks are clicked to be in a to-be-image-recognized state (ON state) when another number has been selected in the check box 1608. In this event, those blocks are set as blocks belonging to a block region different from the aforementioned block region.

For example, assume that 16 blocks in the lower left of the screen 1602 are set in a to-be-image-recognized state (ON state) when NO. 1 has been selected in the check box 1608. In this event, the 16 blocks can be set to belong to one and the same block region, that is, a region 1604-1. Likewise, assume that 9 blocks in the right center of the screen 1602 are set in a to-be-image-recognized state (ON state) when NO. 2 has been selected in the check box 1608. In this event, the 9 blocks can be set to belong to a region 1604-2.

Incidentally, when each to-be-image-recognized block (block in ON state) is displayed in frame color changed in accordance with the number selected in the check box 1608, the operator of the image recognition region setting screen 1601 can recognize the regions 1604-1 and 1604-2 as different groups visually and easily.

Further, the user can use the input box 1609 to set a region name in association with each number in the check box 1608. For example, a region name "front gate" is inputted in the input box 1609 corresponding to the block region NO. 1, that is, the region 1604-1, and a region name "courtyard" is inputted in the input box 1609 corresponding to the block region NO. 2, that is, the region 1604-2. When a submit (transmit) button 1607 is clicked, the contents of the image recognition regions set on the screen 1602 are reported as a table rewrite request to the table generating processing portion 101.

Thus, the monitoring information generating/transmitting processing portion 2203 can add information for distinguishing between the region 1502 (front gate) and the region 1501 (courtyard) in the table 103 shown in FIG. 15 to the monitoring information. For example, a sentence "a moving object was detected in the front gate" or "a moving object was detected in the courtyard" is included in the generated monitoring information. Thus, the user who is an operator of the client PC 2013 or the portable terminal 2012 receiving the monitoring information can grasp the contents of the monitoring information viscerally from the identification name "front gate" or "courtyard".

Although the reporting apparatus 2007 is applied to the monitoring system in FIG. 18 in the aforementioned embodiment, the invention is not limited thereto. Not to say, the reporting apparatus 2007 can be applied to various monitoring systems.

Figure 20:
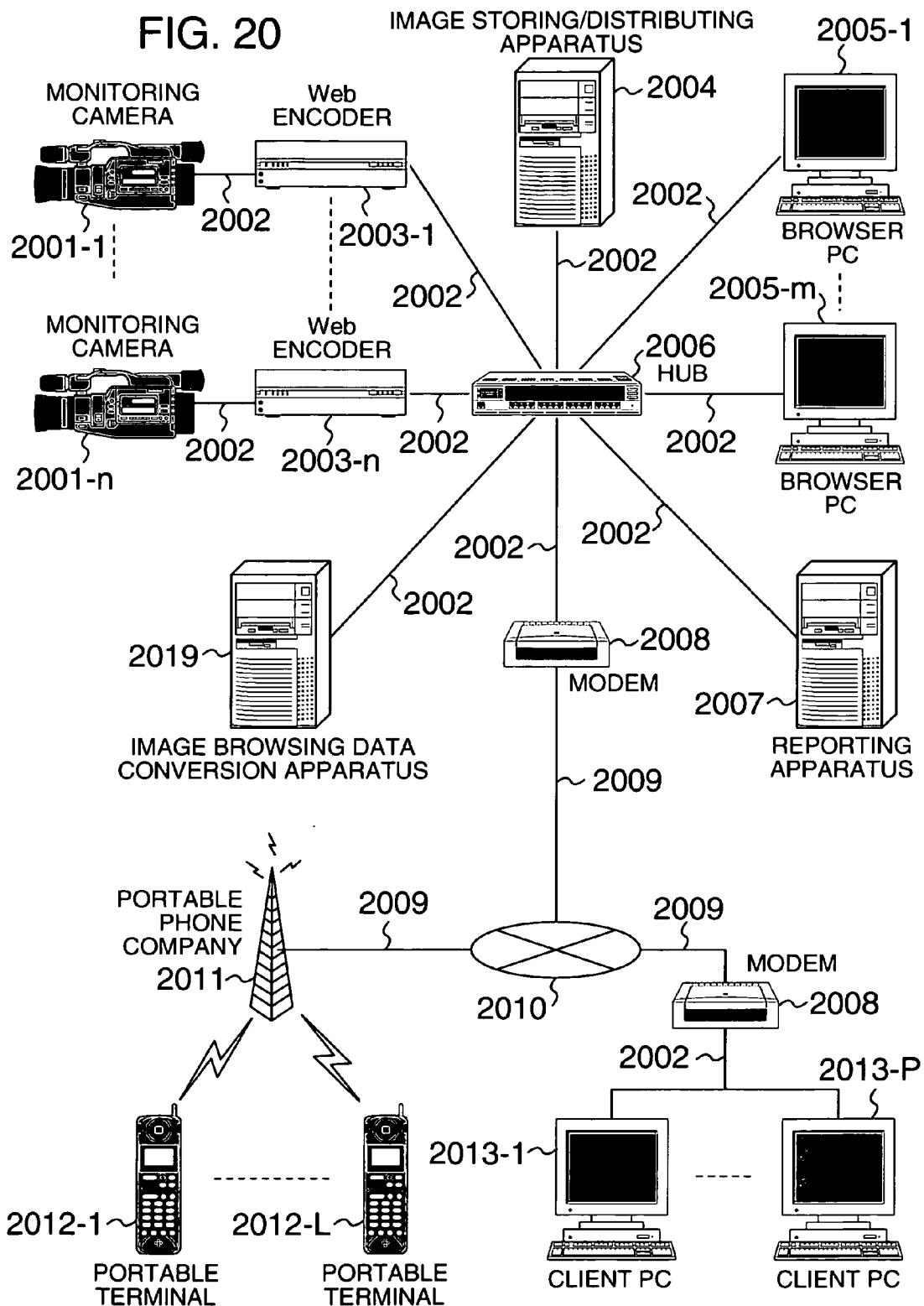
FIG. 20 is a diagram showing an example of the configuration of a network monitoring system according to another embodiment of the present invention.

FIG. 20 is a diagram showing the configuration of a monitoring system according to another embodiment of the present invention. The monitoring system configuration is the same as that in FIG. 18, except that the monitoring system further includes an image browsing data conversion apparatus 2019 connected to a hub 2002.

The monitoring system using an image storing/distributing apparatus and a reporting apparatus will be described with reference to FIG. 20. Incidentally, the configuration and operation of the reporting apparatus 2007 are the same as those in the afore-mentioned embodiment, and description thereof will be omitted.

In FIG. 20, an image browsing data conversion apparatus 2019 has a function of reducing an image so that a portable terminal can gain access to a part of each image stored in the image storing/distributing apparatus 2004. That is, the data conversion apparatus 2019 has a function of creating and storing a reduced image which is reduced in data volume or number of pixels. The hardware configuration of the image browsing data conversion apparatus 2019 may be similar to that in FIG. 19.

In accordance with operation of the portable terminal 2012 or the client PC 2013, the image browsing data conversion apparatus 2019 extracts a desired image from the image storing/distributing apparatus 2004 and transmits a thumbnail of the image to the portable terminal 2012 or the client PC 2013. Incidentally, when the client PC 2013 or the portable terminal 2012 can display a large-data-volume image, the requested image is transmitted from the image storing/distributing apparatus 2004 as it is. In such a manner, each image stored in the image storing/distributing apparatus 2004 can be browsed from the portable terminal 2012 or the client PC 2013.

In the aforementioned embodiments, due to a table provided for processing in a reporting apparatus in the background art, information about a schedule for performing monitoring or a region to be image-recognized can be created and used as data for controlling an image recognition process. Thus, execution or termination of monitoring can be changed so that the trouble of manual operation can be solved. In addition, a region to be image-recognized can be set to reduce the alarms (erroneous alarms) of invader detection in unnecessary locations.

Further, a plurality of tables may be prepared so that one of the tables is used for setting a schedule and the others are used for setting regions to be image-recognized. Thus, even for an image in which a location to be monitored changes in accordance with each period of time, the location where invaders should be monitored can be changed in accordance with each period of time. Thus, it is unnecessary to change the region to be monitored manually only if the schedule and the location to be monitored are determined in advance.

In addition, it will go well if setting for one week or one month is done in one time. Thus, the operating efficiency in monitoring is improved.

The aforementioned embodiments are merely exemplifications, and are not to set any limit to the present invention. Accordingly, various improvements or modifications can be made on the present invention without departing from its gist. For example, when there are a plurality of monitoring cameras 2001, a user may create a table 103 for one of the monitoring cameras 2001. In such a case, an input box in which a monitoring camera 2001 can be selected by its channel number or the like can be provided in the setting screen in FIG. 3 or FIG. 7. Further, in the monitoring system shown in FIG. 18 it is possible to use an apparatus in which the functions of the image storing/distribution apparatus 2004 and notification apparatus 2007 and so on are integrated. Further, the monitoring system explained above is configured to receive images from the image storing/distributing apparatus 2004. Alternatively, the monitoring cameras 2001 and notification apparatus 2007 are connected so that image signals outputted from the monitoring cameras may be directly inputted to the notification apparatus 2007.

In addition, the control method based on a table according to the embodiments is not limited to application to the aforementioned reporting apparatus. It can be also applied widely to other systems such as an object detecting system using image processing for detecting a change in a region to be monitored.

In addition, the application field of the present invention is not limited to the aforementioned filed. The present invention can be applied to various fields. For example, not to say, it can be applied to other fields than the monitoring field.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A change detecting apparatus for detecting a change in an image based on image data of said image, said change detecting apparatus comprising:
   an input portion for inputting said image data obtained by an imaging apparatus;
   a processing unit for processing said image data input from said input portion;
   a storage for storing said image data,
   wherein said processing unit has an image data change detecting portion and a monitoring information output portion,
   wherein said storage has a monitoring schedule table and a plurality of image recognition region tables each having set therein at least one partial region of an image from said imaging apparatus as a to-be-image-recognized region,
   wherein said image data change detecting portion reads said image data from said storage, selects one of said plurality of image recognition region tables in accordance with said monitoring schedule table, and based on the selected image recognition region table, detects a change in a region of said image data corresponding to said to-be-image recognized region, and
   wherein said monitoring information output portion generates a signal representing said change in image data and outputs said signal to a detection result receiving unit which is connected to said change detecting apparatus;

an image recognition region setting screen, wherein said image recognition region setting screen includes a table name setting portion which sets table names of said plurality of image recognition region tables; and a monitoring schedule setting screen, wherein said monitoring schedule setting screen includes an inputting field for allowing a user to set at least one of a plurality of image recognition region tables by using or displaying an identification.

2. A change detecting apparatus according to claim 1, further comprising:

a table generating portion for rewriting said monitoring schedule table, said table generating portion rewriting said monitoring schedule table in accordance with a request from a user.

3. A change detecting apparatus according to claim 2, wherein said table generating portion includes a setting screen generating portion for generating a setting screen including setting boxes for setting a monitoring schedule including a monitoring execution time and a monitoring suspension time, and a display portion for displaying a setting status, so as to allow said user to rewrite said monitoring schedule table.

4. A change detecting apparatus according to claim 1, wherein said receiving unit for receiving detection result includes a notification apparatus and client terminal network-connected to said change detecting apparatus, wherein said signal representing detection result includes monitoring information to be transmitted to said client terminal via said notification unit, said monitoring information including at least one of an image at change detection time point acquired by said imaging apparatus, image pickup time point and the change in the image acquired by said imaging apparatus.

5. A change detecting apparatus according to claim 1, wherein said receiving unit for receiving detection result includes a notification apparatus and client terminal network-connected to said change detecting apparatus, wherein said signal representing detection result includes monitoring information to be transmitted to said client terminal via said notification unit, said monitoring information including a message for indicating that said change in image data is detected.

6. A change detecting apparatus according to claim 1, wherein said detection result receiving unit includes an alarm lamp connected to said change detecting apparatus, wherein said signal representing detection result includes a signal for turning said alarm lamp on in response to said detection of said change in image data.

7. A change detecting apparatus according to claim 1, wherein said detection result receiving unit includes a monitor connected to said change detecting apparatus, wherein said signal representing detection result includes monitoring information to be displayed on said monitor, said monitoring information including at least one of an image at change detection time point acquired by said imaging apparatus, image pickup time point and the change in the image acquired by said imaging apparatus.

8. A change detecting apparatus according to claim 1, wherein said detection result receiving unit includes a monitor connected to said change detecting apparatus, wherein said signal representing detection result includes monitoring information to be displayed on said monitor, said monitoring information including at least one of an image at change detection time point acquired by said imaging apparatus, image pickup time point and the change in the image acquired by said imaging apparatus.

9. A change detecting apparatus according to claim 1, wherein said image data is divided into a plurality of blocks, and at least one of said divided blocks is set as said to-be-image-recognized region.

10. A change detecting apparatus according to claim 9, wherein a size of each of said blocks is changed in accordance with a change request.

11. A change detecting apparatus according to claim 1, further comprising:

a table generating portion for rewriting said image recognition region table, said table generating portion setting said to-be-image-recognized region in accordance with a request from a user.

12. A change detecting apparatus according to claim 11, wherein said table generating portion includes a setting screen generating portion for generating a setting screen for allowing said user to set said image recognition region table, said setting screen including a setting box for allowing said user to set division of a screen of said imaging apparatus into a plurality of blocks and a button for allowing said user to choose whether to perform image recognition on each of said blocks or not.

13. A change detecting apparatus according to claim 1, wherein said table generating portion includes a setting screen generating portion for generating a setting screen for allowing said user to set said image recognition region table, said setting screen including a region name setting portion for setting a region name of each to-be-image-recognized region, said signal representing said change in image data including a region name of a to-be-image-recognized region where said change in image data has been detected.

14. A change detecting apparatus according to claim 13, wherein said setting screen includes an input field for allowing said user to set at least one partial region of said image data from said imaging apparatus as a to-be-image-recognized region and a box for allowing said user to input a name of each to-be-image-recognized region.

15. A change detecting apparatus according to claim 13, wherein the region name where said change in image data has been detected is reported to said detection result receiving unit.

16. A change detecting method for detecting a change in an image based on image data, said change detecting method comprising the steps of:

storing in a storage a monitoring schedule table and a plurality of image recognition region tables each having set therein at least one partial region of an image from an imaging apparatus as a to-be-image-recognized region;

providing an image recognition region setting screen, wherein said image recognition region setting screen includes a table name setting portion which sets table names of said plurality of image recognition region tables;

providing a monitoring schedule setting screen, wherein said monitoring schedule setting screen includes an inputting field for allowing a user to set at least one of said plurality of image recognition region tables by using or displaying at least one of said table names or an identification thereof;

inputting said image data obtained by said imaging apparatus;

processing said image data having been input;

storing said image data in a storage;

reading said image data from said storage, selecting one of said plurality of image recognition region tables in accordance with said monitoring schedule table, and based on the selected image recognition region table, detecting a change in a region of said image data corresponding to said to-be-image-recognized region; and generating a signal representing said change in said region and outputting said signal.

* * * * *